US010089327B2

(12) United States Patent
Sweet, III et al.

(10) Patent No.: US 10,089,327 B2
(45) Date of Patent: Oct. 2, 2018

(54) SMART CAMERA FOR SHARING PICTURES AUTOMATICALLY

(75) Inventors: Charles Wheeler Sweet, III, San Diego, CA (US); Joel Simbulan Bernarte, Encinitas, CA (US); Virginia Walker Keating, San Diego, CA (US); Serafin Diaz Spindola, San Diego, CA (US); Charles A. Bergan, Cardiff, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 13/563,149

(22) Filed: Jul. 31, 2012

(65) Prior Publication Data

US 2013/0194438 A1  Aug. 1, 2013

Related U.S. Application Data

(60) Provisional application No. 61/525,148, filed on Aug. 18, 2011.

(51) Int. Cl.
*G06F 17/30* (2006.01)
*G06K 9/00* (2006.01)
(Continued)

(52) U.S. Cl.
CPC ........ *G06F 17/30247* (2013.01); *G06F 3/005* (2013.01); *G06K 9/00221* (2013.01); *G06Q 50/01* (2013.01)

(58) Field of Classification Search
USPC ......................................................... 725/105
See application file for complete search history.

(56) References Cited

U.S. PATENT DOCUMENTS 5,812,193 A  9/1998  Tomitaka et al.
7,254,256 B2  8/2007  Chen et al.
(Continued)

FOREIGN PATENT DOCUMENTS

CN  101039250 A  9/2007
CN  101826157 A  9/2010
(Continued)

OTHER PUBLICATIONS

Hampapur, Arun, et al., "Smart video surveillance", IEEE Signal Processing Magazine, Mar. 1, 2005 (Mar. 1, 2005), IEEE Service Center, Piscataway, NJ, US, vol. 22, No. 2, pp. 38-51, XP011128092, ISSN: 1053-5888.

(Continued)

*Primary Examiner* — Roberto Velez
*Assistant Examiner* — Yih-Sien Kao
(74) *Attorney, Agent, or Firm* — Kilpatrick Townsend & Stockton, LLP

(57) ABSTRACT

Embodiments of the invention disclose methods, apparatuses, systems, and computer-readable media for taking and sharing pictures of objects of interest at an event or an occasion. A device implementing embodiments of the invention may enable a user to select objects of interest from a view displayed by a display unit coupled to the device. The device may also have pre-programmed objects including objects that the device detects. In addition, the device may detect people using the users' social networks by retrieving images from social networks like Facebook® and LinkedIn®.

47 Claims, 12 Drawing Sheets

(51) Int. Cl.
  *G06Q 50/00*   (2012.01)
  *G06F 3/00*   (2006.01)

(56) References Cited

U.S. PATENT DOCUMENTS

| | | | |
|---|---|---|---|
| 7,373,109 B2* | 5/2008 | Pohja et al. | 455/41.2 |
| 7,467,222 B2* | 12/2008 | Kacker | 709/232 |
| 7,471,334 B1 | 12/2008 | Stenger | |
| 7,679,651 B2 | 3/2010 | Tsunoda | |
| 7,787,664 B2 | 8/2010 | Luo et al. | |
| 7,826,092 B2 | 11/2010 | Ejima et al. | |
| 8,027,512 B2 | 9/2011 | Jaspers et al. | |
| 8,041,076 B1 | 10/2011 | Bourdev | |
| 2002/0149681 A1 | 10/2002 | Kahn et al. | |
| 2002/0167537 A1 | 11/2002 | Trajkovic | |
| 2003/0099376 A1 | 5/2003 | Kim et al. | |
| 2004/0243671 A9* | 12/2004 | Needham et al. | 709/204 |
| 2005/0129324 A1 | 6/2005 | Lemke | |
| 2005/0218259 A1 | 10/2005 | Kamon | |
| 2005/0231589 A1 | 10/2005 | Chiang | |
| 2006/0045372 A1 | 3/2006 | Wang et al. | |
| 2006/0133648 A1 | 6/2006 | Meunier et al. | |
| 2006/0204034 A1 | 9/2006 | Steinberg et al. | |
| 2007/0076960 A1* | 4/2007 | Takamori et al. | 382/224 |
| 2007/0150827 A1 | 6/2007 | Singh et al. | |
| 2007/0201694 A1 | 8/2007 | Bolle et al. | |
| 2007/0268369 A1 | 11/2007 | Amano et al. | |
| 2008/0310688 A1* | 12/2008 | Goldberg | 382/118 |
| 2009/0080715 A1 | 3/2009 | Van Beek et al. | |
| 2009/0175551 A1 | 7/2009 | Thorn | |
| 2009/0190803 A1 | 7/2009 | Neghina et al. | |
| 2009/0280859 A1* | 11/2009 | Bergh | 455/556.1 |
| 2009/0324010 A1 | 12/2009 | Hou | |
| 2009/0324098 A1 | 12/2009 | Nilsson | |
| 2010/0034427 A1 | 2/2010 | Fujimura et al. | |
| 2010/0107202 A1* | 4/2010 | Gerard et al. | 725/105 |
| 2010/0150407 A1 | 6/2010 | Cheswick | |
| 2010/0245567 A1 | 9/2010 | Krahnstoever et al. | |
| 2010/0277611 A1 | 11/2010 | Holt et al. | |
| 2010/0287053 A1 | 11/2010 | Ganong et al. | |
| 2011/0007175 A1 | 1/2011 | Fujita et al. | |
| 2011/0014932 A1 | 1/2011 | Estevez | |
| 2011/0044512 A1 | 2/2011 | Bambha et al. | |
| 2011/0047182 A1 | 2/2011 | Shepherd et al. | |
| 2011/0047517 A1 | 2/2011 | Lee et al. | |
| 2011/0064281 A1 | 3/2011 | Chan | |
| 2011/0066431 A1 | 3/2011 | Ju et al. | |
| 2011/0103643 A1 | 5/2011 | Salsman et al. | |
| 2011/0103644 A1 | 5/2011 | Garten | |
| 2011/0109759 A1 | 5/2011 | Abe | |
| 2011/0205077 A1 | 8/2011 | Cavallaro et al. | |
| 2011/0227810 A1 | 9/2011 | McKinney et al. | |
| 2011/0273466 A1 | 11/2011 | Imai et al. | |
| 2011/0295742 A1 | 12/2011 | Boncyk et al. | |
| 2012/0328202 A1* | 12/2012 | Tian et al. | 382/209 |
| 2013/0201344 A1 | 8/2013 | Sweet, III | |

FOREIGN PATENT DOCUMENTS

| | | |
|---|---|---|
| CN | 102025654 A | 4/2011 |
| EP | 1426898 A2 | 6/2004 |
| EP | 1793580 A1 | 6/2007 |
| EP | 2261839 A1 | 12/2010 |
| JP | H10143414 A | 5/1998 |
| JP | 2004192646 A | 7/2004 |
| JP | 2010122733 A | 6/2010 |
| WO | 03034361 A1 | 4/2003 |
| WO | 2009064086 A1 | 5/2009 |

OTHER PUBLICATIONS

Huang Qian et al., "Content based active video data acquisition via automated cameramen", Proceedings of International Conference on Image Processing (ICIP 1998), Chicago, IL, USA Oct. 4-7, 1998, Los Alamitos, CA, USA, IEEE Computer Society, US, vol. 2, Oct. 4, 1998 (Oct. 4, 1998), p. 808-812, XP010308666, DOI: 10.1109/ICIP.1998.723682, ISBN: 978-0-8186-8821-8.

Kulkarni Purushottam et al., "SensEye", Proceedings of the 13th Annual ACM International Conference on Multimedia, Multimedia, Jan. 1, 2005 (Jan. 1, 2005), p. 229, XP055062532, New York, USA, DOI: 10.1145/1101149.1101191, ISBN: 978-1-59-593044-6.

Instant fundas, "Fix group photos, remove unwanted objects and clone yourself with Windows Live Photo Gallery's Photo Fuse, Oct. 6, 2010 by Kaushik Software," Retrieved from:http://www.instantfundas.com/2010/10/fix-group-photos-remove-unwanted.html.

Ahern Shane, "Over-Exposed? Privacy Patterns and Considerations in Online and Mobile Photo Sharing", CHI Proceedings, Photo Sharing, Apr. 28, 2007, pp. 357-366, XP055046203, Retrieved from the Internet: URL: http://nguyendangbinh.org/Proceedings/CHI/2007/docs/p357.pdf [retrieved on Nov. 30, 2012].

Hong Dan et al., "Setting Access Permission through Transitive Relationship in Web-based Social Networks", Weaving Services and People on the World Wide Web, Apr. 22, 2008, pp. 1-8, XP055046201.

International Search Report and Written Opinion—PCT/US2012/049220—ISA/EPO—dated Dec. 11, 2012.

Monaghan F. et al., "Automating Photo Annotation using Services and Ontologies", 7th International Conference on Mobile Data Management (MDM) May 10-12, 2006, May 10, 2006, pp. 79-79, Piscataway, NJ, USA, IEEE, XP010917953, DOI: 10.1109/MDM.2006.39, ISBN: 978-0-7695-2526-6.

Liu Qiong. et al., "FLYSPEC: A Multi-User Video Camera System with Hybrid Human and Automatic Control", Proceedings ACM Multimedia, 10th International Conference on Multimedia Juan-Les-Pins, France, Dec. 1-6, 2002, NY : ACM, US, vol. CONF. 10, Dec. 1, 2002 (Dec. 1, 2002), pp. 484-492, XP001175050, DOI: 10.1145/641007.641110 ISBN: 978-1-58113-620-3.

Zhang Mingju et al., "Auto Cropping for Digital Photographs", IEEE International Conference on Multimedia and Expo (ICME), Amsterdam, The Netherlands, Jul. 6-8, 2005, IEEE, Piscataway, NJ, USA, Jul. 6, 2005 (Jul. 6, 2005), pp. 438-441, XP010843290, DOI: 10.1109/ICME.2005.1521454, ISBN: 978-0-7803-9331-8.

* cited by examiner

Click Sharing

Automatic Location Check-in and People Tagging

SMART CAMERA FOR SHARING PICTURES AUTOMATICALLY

CROSS-REFERENCE TO RELATED APPLICATIONS

This patent application claims the benefit of U.S. Provisional Patent Application Ser. No. 61/525,148 filed Aug. 18, 2011, and entitled "Smart Camera Automatically Take and Share Great Shots," which is incorporated by reference herein in its entirety for all purposes.

BACKGROUND

Aspects of the disclosure relate to computing technologies. In particular, aspects of the disclosure relate to mobile computing device technologies, such as systems, methods, apparatuses, and computer-readable media for acquiring and sharing images.

In the past, taking pictures has always been a ceremonial event reserved for special occasions such as birthday parties, family reunions, and trips to exotic destinations or as a hobby. However, cameras are becoming ubiquitous with their integration into smart phones and people are taking many more pictures than they used to. Taking and sharing pictures have become the new norm of the social fabric. The younger generations want to take and share pictures instantaneously, on the go.

Capturing, managing, and uploading pictures to the social network is still a cumbersome task. After taking a picture, in many instances, the user usually downloads the pictures to a computer and sorts through the pictures, keeping the best shots and deleting the rest. Once the pictures are sorted and edited the user uploads the pictures to a social network. The user loads the picture to a particular social network or circle depending on the subject of the picture. For instance, a user may load pictures of colleagues at the office to a professional social network like LinkedIn®, whereas, the user may load pictures from a friend's reunion to a social network like Facebook® or a circle dedicated to friends in a social network like Google Plus®.

In the current usage model there are too many steps involved for the user before the user can load and share decent pictures on a social network. The process is both time-consuming and cumbersome.

Embodiments of the invention help solve this and other problems.

SUMMARY

Techniques are provided for taking and sharing pictures of objects of interest at an event or an occasion. Embodiments of the invention disclose methods, apparatuses, systems, and computer-readable media for taking and sharing pictures of objects of interest at an event or an occasion. A device implementing embodiments of the invention may enable a user to select objects of interest from a view displayed by a display unit coupled to the device. The device may also have pre-programmed objects including objects that the device detects. In addition, the device may detect people using the users' social networks by retrieving images from social networks like Facebook® and LinkedIn®.

An example method for sharing pictures using a device comprises accessing image data for an image, accessing identification of at least one object obtained by processing of the image data for the image, accessing sharing attributes associated with the at least one object in the image, automatically associating the image with sharing attributes, and generating information to share the image based on the sharing attributes.

In one embodiment, identifying the at least one object comprises generating a first representation of at least a portion of the image associated with the at least one object using some or all of the image data, and comparing the first representation to a second representation of a reference object stored in a database. In one aspect, the database is one of an internal database stored on the device used for sharing pictures or an external database belonging to a network resource.

In another embodiment, identifying the at least one object comprises accessing at least one characteristic associated with the at least one object, and determining the identification of the at least one object based on the at least one characteristic associated with the at least one object. In one aspect the object is a person and facial recognition may be used in identifying the portion of the image associated with the at least one object comprising a face of the person.

In one aspect, identification of an object is performed using a low resolution representation of the object. The method may also comprise associating the image with a social network or a grouping of objects within a social network based on the sharing attributes of the image. The sharing attributes may be derived using one or more of a location at which the image was captured, a time at which the image was captured, a history of association of similar objects for the at least one object identified, a characteristic of the at least one object and facial recognition of people in the image, a relationship of the user of the device with a grouping of objects within a social network, and a digital trust between the user of the device and the grouping of objects within the social network.

In some embodiments, the identified object is a person. The person may be granted access rights to the image using network resources. The method may further comprise automatically granting to a second person access rights to the image using the network resources based on a transitive trust established between the first person and the second person using a first trust relationship between the first person and a user of the device and a second trust relationship between the second person and the user of the device. In other implementations, the method may automatically grant to a group of people access rights to the image using the network resources based on an association of the first person with the group of people.

The method performed by embodiments of the invention for sharing pictures may further include receiving the image data for the image from the device at a server using network resources, and sending information for sharing the image based on the sharing attributes from the server.

In one embodiment, the method for sharing pictures may also include providing a user with a user interface configured for highlighting the at least one object displayed on a display unit of the device. The method may further comprise receiving input using the user interface to perform one or more of selecting, rejecting or modifying the highlighted object. The method may tag the highlighted object with identifiable information about the at least one object. Another aspect may include providing the user with a list comprising at least one association based on the sharing attributes. Another aspect may include providing the user with the user interface to share the image associating the image with other groupings of objects based on the sharing attributes of the image using network resources.

An example device implementing the system may include a processor; an input sensory unit coupled to the processor; a display unit coupled to the processor; and a non-transitory computer readable storage medium coupled to the processor, wherein the non-transitory computer readable storage medium may comprise code executable by the processor, that comprises accessing identification of at least one object obtained by processing of the image data for the image, accessing sharing attributes associated with the at least one object in the image, automatically associating the image with sharing attributes, and generating information to share the image based on the sharing attributes.

In one embodiment, the device identifies the at least one object by generating a first representation of at least a portion of the image associated with the at least one object using some or all of the image data, and comparing the first representation to a second representation of a reference object stored in a database. In one aspect, the database may be one of an internal database stored on the device used for sharing pictures or an external database belonging to a network resource.

In another embodiment, the device identifies the at least one object by accessing at least one characteristic associated with the at least one object, and determining the identification of the at least one object based on the at least one characteristic associated with the at least one object. In one aspect the object is a person and facial recognition may be used in identifying the portion of the image associated with the at least one object comprising a face of the person.

In one aspect, identification of an object is performed using a low resolution representation of the object. The device may also comprise associating the image with a social network or a grouping of objects within a social network based on the sharing attributes of the image. The sharing attributes may be derived using one or more of a location at which the image was captured, a time at which the image was captured, a history of association of similar objects for the at least one object identified, a characteristic of the at least one object and facial recognition of people in the image, a relationship of the user of the device with a grouping of objects within a social network, and a digital trust between the user of the device and the grouping of objects within the social network.

In some embodiments, the identified object is a (first) person. The person may be granted access rights to the first person identified in the image using network resources. The device may automatically grant access rights to a second person to the image using the network resources based on a transitive trust established between the first person and the second person using a first trust relationship between the first person and a user of the device and a second trust relationship between the second person and the user of the device. In other implementations, the device may automatically grant to a group of people access rights to the image using the network resources based on an association of the first person with the group of people.

The device may further include components for receiving the image data for the image from the device at a server using network resources, and sending information for sharing the image based on the sharing attributes from the server.

In one embodiment, the device for sharing pictures may also include providing a user with a user interface configured for highlighting the at least one object displayed on a display unit of the device. The device may further comprise receiving input using the user interface to perform one or more of selecting, rejecting or modifying the highlighted object. The device may tag the highlighted object with identifiable information about the at least one object. Another aspect may include providing the user with a list comprising at least one association based on the sharing attributes. Another aspect may include providing the user with the user interface to share the image associating the image with other groupings of objects based on the sharing attributes of the image using network resources.

An example non-transitory computer readable storage medium coupled to a processor, wherein the non-transitory computer readable storage medium comprises a computer program executable by the processor, accessing an image data for an image, accessing identification of an at least one object obtained by processing of the image data for the image, accessing sharing attributes associated with the at least one object in the image, automatically associating the image with sharing attributes, and generating information to share the image based on the sharing attributes.

An example apparatus for sharing images comprises a means for accessing an image data for an image, means for accessing identification of an at least one object obtained by processing of the image data for the image, means for accessing sharing attributes associated with the at least one object in the image, means for automatically associating the image with sharing attributes, and means for generating information to share the image based on the sharing attributes.

The foregoing has outlined rather broadly the features and technical advantages of examples, according to the disclosure, in order for the detailed description that follows to be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The current techniques relate to image acquisition and sharing the acquired images. As cameras are available on more and more devices and images are shared across various different social fabrics, the process for sharing images is relatively unchanged. Typically, a user acquires an image and manually selects the social media and context for sharing the images. The process of acquiring images, managing, organizing, editing, and uploading pictures to the social network are a cumbersome task. After taking a picture, the user is inundated with downloading the pictures to a computer, sorting through the pictures, keeping the best shots and uploading the pictures to a social network. The user loads the picture to a particular social network or circle depending on the subject of the picture. For instance, a user may load pictures of colleagues at the office to a professional social network like LinkedIn®, whereas, the user may load pictures from a friend's reunion to a social network like Facebook® or a circle dedicated to friends in a social network like Google Plus®.

By contrast, the current disclosure provides techniques that allow sharing images in a smarter way. In some embodiments, the one or more objects from the field of view of the camera are identified. Various sharing attributes associated with the image may be derived using information from the user's social networks and various other suitable techniques, as described in further detail below. Based on the sharing attributes, the device may automatically provide the user with suggestions for sharing the acquired images or automatically share the images without user intervention.

Figure 1:
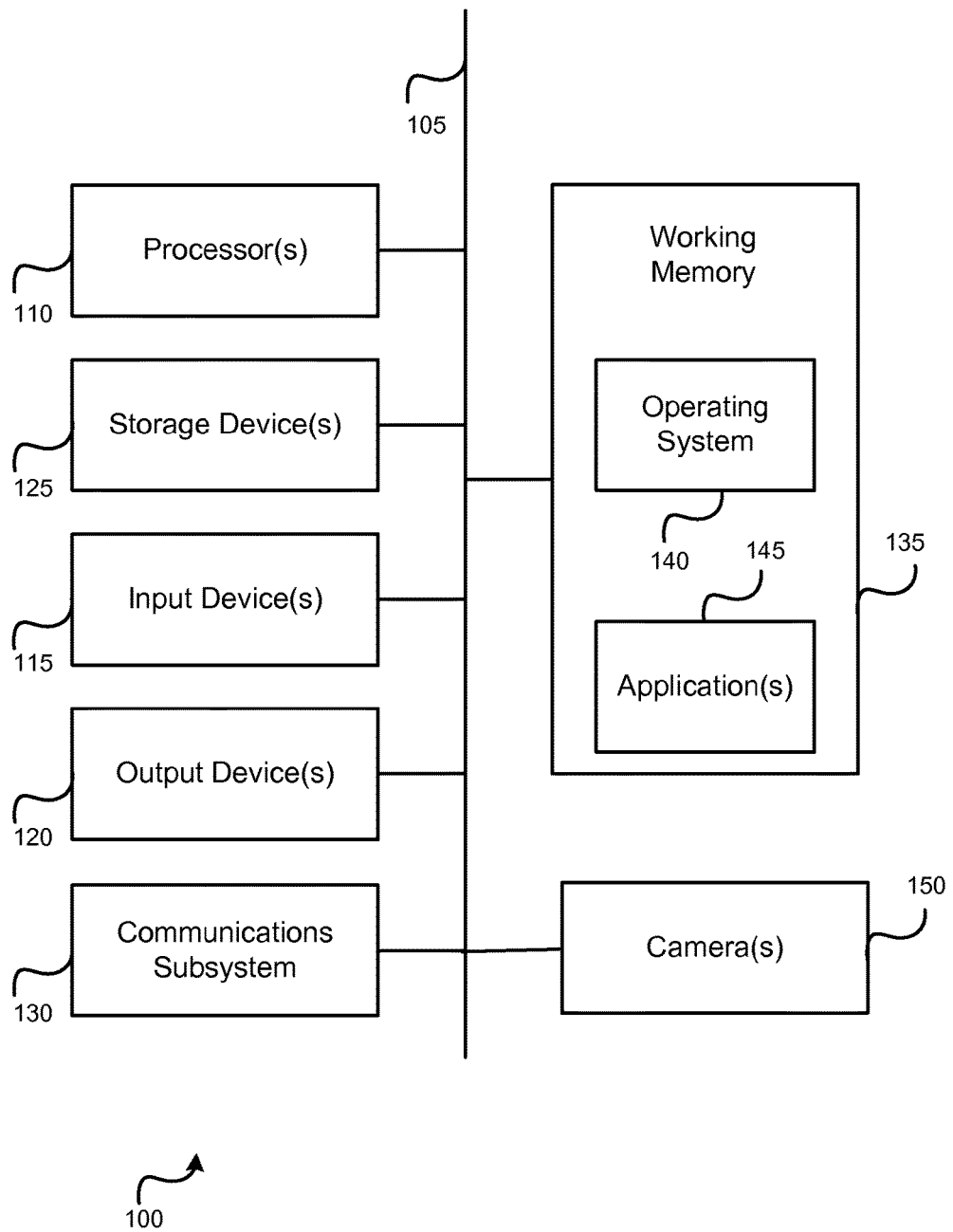
FIG. 1 illustrates an exemplary device in which one or more aspects of the disclosure may be implemented.

FIG. 1 illustrates an exemplary device incorporating parts of the device employed in practicing embodiments of the invention. An exemplary device as illustrated in FIG. 1 may be incorporated as part of the described computerized device below. For example, device 100 can represent some of the components of a mobile device. A mobile device may be any computing device with an input sensory unit like a camera and a display unit. Examples of a mobile device include, but are not limited to, video game consoles, tablets, smart phones, camera devices and any other hand-held devices suitable for performing embodiments of the invention. FIG. 1 provides a schematic illustration of one embodiment of a device 100 that can perform the methods provided by various other embodiments, as described herein, and/or can function as the host device, a remote kiosk/terminal, a point-of-sale device, a mobile device, a set-top box and/or a device. FIG. 1 is meant only to provide a generalized illustration of various components, any or all of which may be utilized as appropriate. FIG. 1, therefore, broadly illustrates how individual system elements may be implemented in a relatively separated or relatively more integrated manner. FIG. 1 is an exemplary hand-held camera device or mobile device that may use components as described in reference to FIG. 1. In one embodiment, only some of the components described in FIG. 1 are implemented and enabled to perform embodiments of the invention. For example, a camera device may have one or more cameras, storage, or processing components along with other components described in FIG. 1.

The device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115, which can include without limitation a camera, sensors (including inertial sensors), a mouse, a keyboard and/or the like and one or more output devices 120, which can include without limitation a display unit, a printer and/or the like. In addition, hardware elements may also include one or more cameras 150, as shown in FIG. 1, for acquiring the image content as discussed in further detail below.

The device 100 may further include (and/or be in communication with) one or more non-transitory storage devices 125, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including, without limitation, various file systems, database structures, and/or the like.

The device 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), other devices, and/or any other devices described herein. In many embodiments, the device 100 will further comprise a non-transitory working memory 135, which can include a RAM or ROM device, as described above.

The device 100 also can comprise software elements, shown as being currently located within the working memory 135, including an operating system 140, device drivers, executable libraries, and/or other code, such as one or more application programs 145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 125 described above. In some cases, the storage medium might be incorporated within a device, such as device 100. In other embodiments, the storage medium might be separate from a device (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the device 100 and/or might take the form of source and/or installable code, which, upon compilation and/or installation on the device 100 (e.g., using any of a variety of generally available compilers, installation programs, compression/decompression utilities, etc.), then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a device (such as the device 100) to perform methods in accordance with the disclosure. For example, some or all of the procedures of the described methods may be performed by the device 100 in response to processor 110 executing one or more sequences of one or more instructions (which might be incorporated into the operating system 140 and/or other code, such as an application program 145) contained in the working memory 135. Such instructions may be read into the working memory 135 from another computer-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer-readable medium," as used herein, may refer to any article of manufacture or medium that participates in providing data that causes a machine to operate in a specific fashion. In an embodiment implemented using the device 100, various computer-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 125. Volatile media include, without limitation, dynamic memory, such as the working memory 135. "Computer readable medium," "storage medium," and other terms used herein do not refer to transitory propagating signals. Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, or any other memory chip or cartridge.

Various forms of computer-readable media may be involved in carrying one or more sequences of one or more instructions to the processor(s) 110 for execution. Merely by way of example, the instructions may initially be carried on a magnetic disk and/or optical disc of a remote computer. The communications subsystem 130 (and/or components thereof) generally will receive the signals, and the bus 105 then might carry the signals (and/or the data, instructions, etc. carried by the signals) to the working memory 135, from which the processor(s) 110 retrieves and executes the instructions. The instructions received by the working memory 135 may optionally be stored on a non-transitory storage device 125 either before or after execution by the processor(s) 110.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Techniques are provided for taking great pictures of objects including people at an event. The techniques described in the embodiments of the invention are particularly useful for tracking one or more objects and automatically taking pictures of objects of interest during an event. The user may switch the mobile device to an Event Mode that allows the user to delegate some of the picture-taking responsibilities to the mobile device during an event.

Figure 2A:
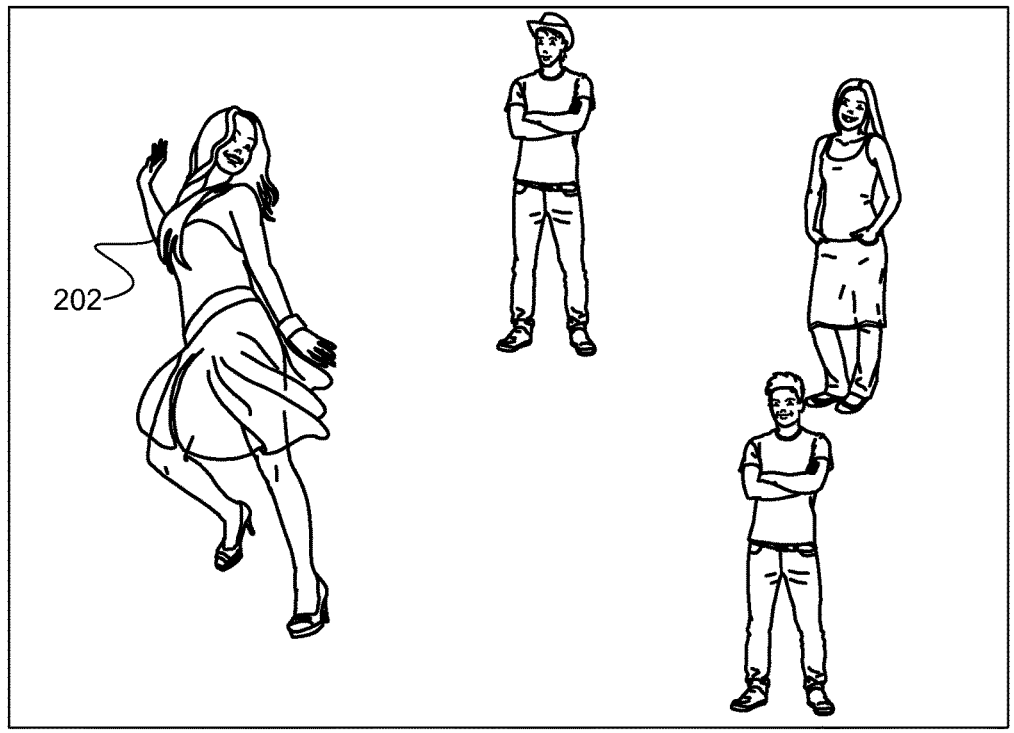
FIG. 2A and FIG. 2B illustrate an exemplary embodiment performed by components of the device for tracking a person over a period of time at an event.
Figure 2B:
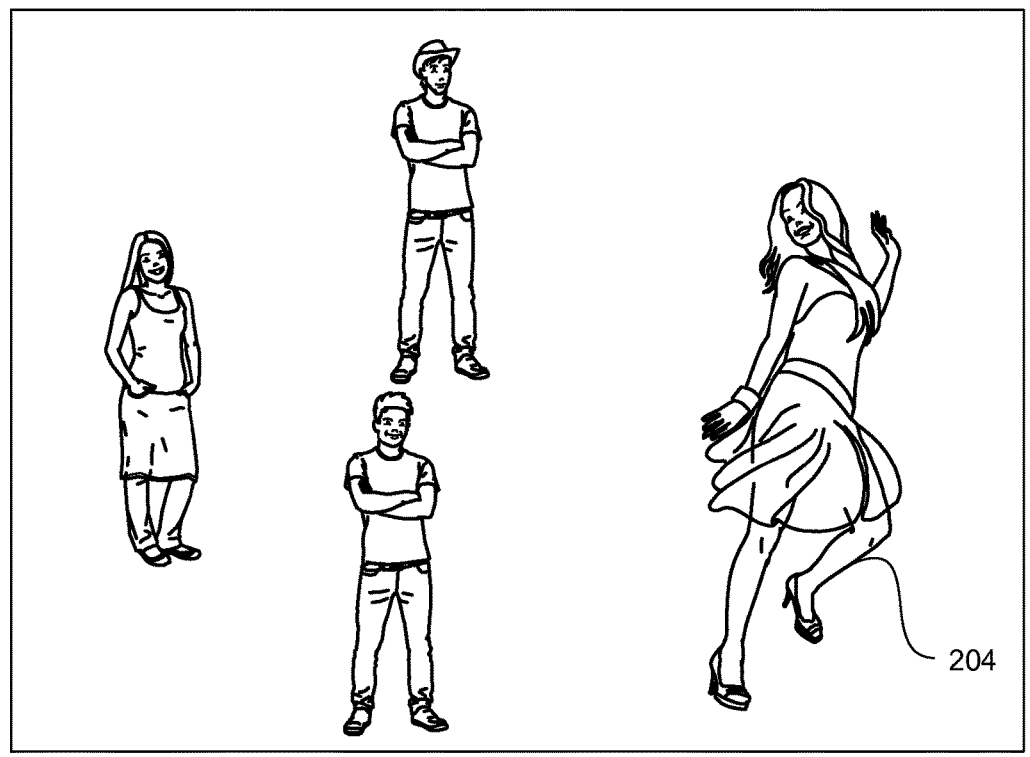

FIG. 2 is an exemplary embodiment performed by components of the device such as device 100 of FIG. 1 for tracking a particular person over a period of time at an event. FIG. 2 illustrates two images of a group of friends at a party, taken by the mobile device in Event Mode. The object of interest identified using the processor 110 of FIG. 1 in FIG. 2A is a particular woman 202 (shown dancing at the party). The mobile device 100 tracks the woman at the party and acquires pictures of the woman as she moves around the room. In FIG. 2B, the camera 150 coupled to the device 100 acquires another picture of the same woman 204 dancing at the party at a new location. The device 100 may be placed in an Event Mode either automatically or by a user who enables the mode to identify and track subjects such as the woman from FIGS. 2A and 2B.

Figure 3:
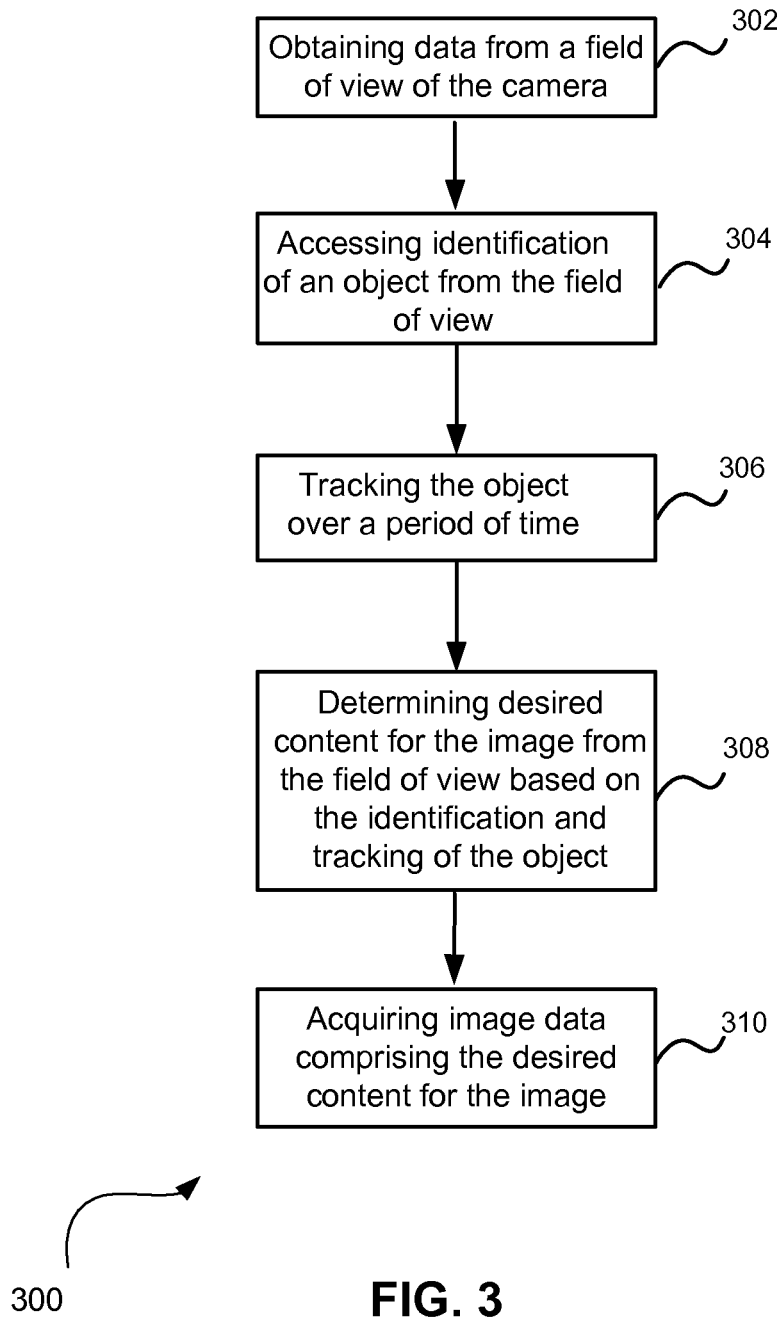
FIG. 3 is a simplified flow diagram, illustrating an exemplary method 300 for tracking an object and acquiring image data from the field of view.

FIG. 3 is a simplified flow diagram, illustrating a method 300 for tracking an object and acquiring image data from the field of view. The method 300 may be referred to as "Event Mode," while describing embodiments of the invention, and should not be construed in a manner that is limiting to aspects of the invention in any manner. The method 300 is performed by processing logic that comprises hardware (circuitry, dedicated logic, etc.), software (such as is run on a general purpose computing system or a dedicated machine), firmware (embedded software), or any combination thereof. In one embodiment, the method 300 is performed by device 100 of FIG. 1.

Referring to FIG. 3, at block 302, the device obtains data from a field of view of the camera 150 coupled to the device for the purpose of identifying one or more objects present in the field of view. In some implementations, the data may be a representation of the entire field of view visible to the camera lens (e.g., FIG. 2A) or a representation of a portion of the field of view visible to the camera lens (e.g., person 202 and surrounding area) of the camera coupled to the device.

At block 304, the device accesses an identification of at least one object, such as a particular person 202 from FIG. 2A. Identification information about the image is obtained by processing of the data acquired in block 302. In some implementations, the identification of an object is performed using a low resolution representation of the object. The processing of the data to identify the one or more objects from the data may be performed locally at the device or remotely using network resources, such as a remote server. When the identification of the object occurs at a remote server, the device transmits data to the remote server for processing of the data for the identification of one or more objects, and receives the identification of the object for tracking, determining desired content and acquiring the image data. Furthermore, the device may use locally stored data from a local database stored on the device or a remote database for the purpose of identifying an object. In one embodiment, the device from FIG. 1 accesses an internal database stored on the device before accessing an external database belonging to a network resource for identifying the at least one object. In other embodiments, the internal database is a subset of the external database. For instance, the internal database may be implemented as a cache storing the most recently accessed information. The cache may be implemented using hardware caches, working memory 135 or storage device(s) 125.

In the Event Mode, the device accesses identification information about one or more objects of interest for the event visible to the camera. In one aspect, identification of the at least one object may include generating a representation of a portion of the image associated with the object using some or all of the data visible to the camera and comparing the representation of a portion of the image to a representation of a reference object stored in a database. In some instances, the object of interest is a person and facial recognition techniques are used in identifying a portion of the image associated with the at least one object comprising a face of the person. In FIG. 2A, the person 202 may be identified using facial recognition techniques. Known facial recognition techniques such as Principal Component Analysis, Linear Discriminate Analysis, Elastic Bunch Graph Matching or any other suitable techniques may be used for facial recognition.

The faces of the people in the field of view may be compared against reference images of faces stored locally on the device. In addition, the device may be connected to network resources using a wireless connection such as WiFi, Wimax, LTE, CDMA, GSM connection or any other suitable means. In some instances, the device may also be connected to network resources through a wired connection. The device may have access to identification information in the field of view of the camera using a social network using network resources. The device may use the user's relationships or/and digital trust established and accessible through the user's social network. For instance, the device may access the user's social networks and facilitate matching the obtained image to images from social networks like Facebook® and LinkedIn®. Facial recognition may not be limited to people and may include facial recognition of animals. For instance, social networking websites have accounts dedicated to pets. Therefore, identifying facial features for facial recognition may include facial and other features for animals.

As discussed earlier, the device may use a hierarchical system for efficiently identifying objects in the field of view of the camera lens against stored images. For instance, if the user's brother enters the field of view, the mobile device may have a stored image of the user's brother in any of local storage media, a cache or memory. The device may be loaded with the most relevant objects of interest to the user by the device. On the other hand, there may be situations where an infrequently visited friend from high school who is only connected to the user through Facebook shows up in front of the camera lens. In such a scenario, the device may search the local storage, cache and memory and may not identify the person using the local resources. The mobile device may connect to a social network using the network resources to identify the face against the user's social network. In this instance, the device will facilitate finding the user's friend through her/his connections in Facebook®.

A social network or social group may be defined as an online service, platform, or site that focuses on facilitating the building of social networks or social relations among people who, for example, share interests, activities, backgrounds, or real-life connections. A social network service may consist of a representation of each user (often a profile), his/her social links, and a variety of additional services. Most social network services are web-based and provide means for users to interact over the Internet, such as e-mail and instant messaging.

Figure 4:
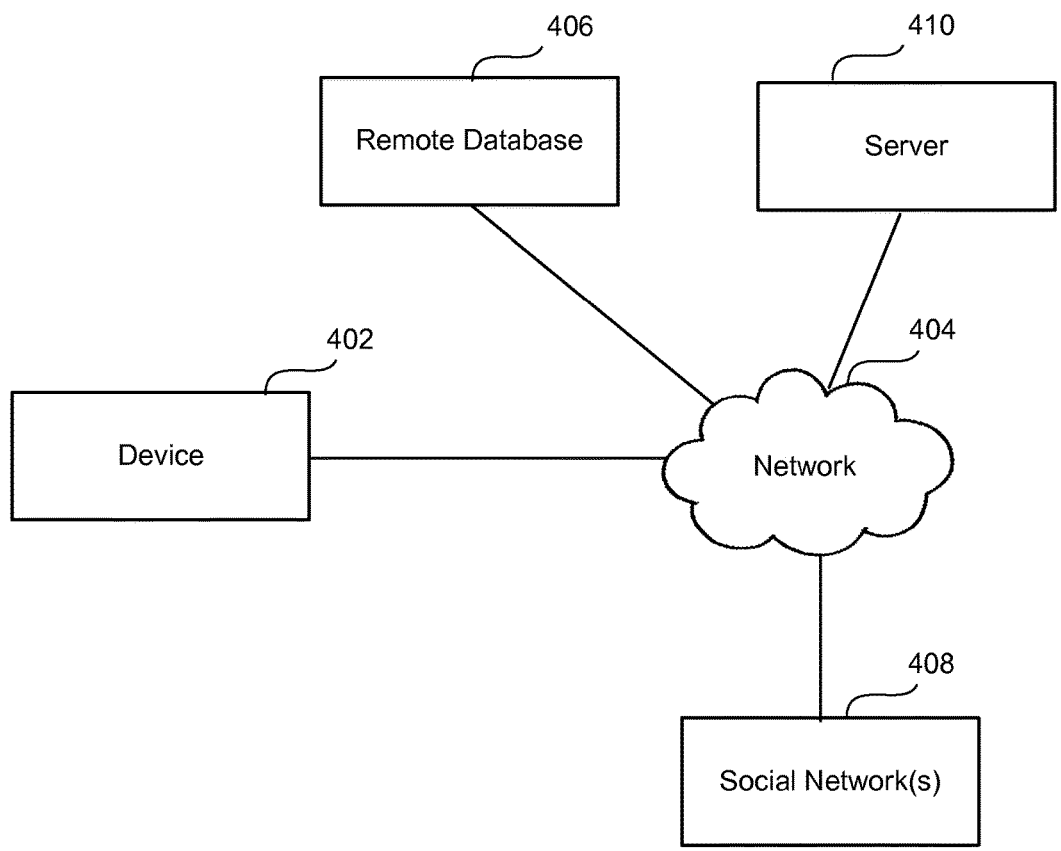
FIG. 4 illustrates a simplified topology between a device and a network.

Briefly, referring to the oversimplified and exemplary FIG. 4, as discussed earlier, the device 402 (device 100 of FIG. 1) may be connected to network resources. Network resources may include, but are not limited to, network connectivity, processing power, storage capacity and the software infrastructure. In some implementations, all or part of the network resource may be referred as a "cloud." Remote database(s) 406, server(s) 410 and social network(s) 408 may exist as part of the network 404. Social networks may include social connectivity networks and social media networks such as Facebook®, Twitter®, Four-Square®, Google Plus®, etc. The device 402 may connect to the various network resources through a wireless or wired connection.

In another embodiment, identification of the object may include accessing an at least one characteristic associated with the at least one object, and determining the identification of the at least one object based on the at least one characteristic associated with the at least one object. For example, during a soccer match, the mobile device may be able to identify a soccer ball and track the soccer ball on the field based on the dimensions and characteristics of the soccer ball or/and by partially matching the soccer ball to a stored image.

Once one or more objects are identified in the field of view of the camera lens, the device may provide a user interface for the user to select, or reject or modify the identified objects. The user interface may involve providing an interface to the user using a display unit coupled to the mobile device. The display unit could be a capacitive sensory input such as a "touch screen." In one embodiment, the mobile device may highlight the identified objects by drawing boxes or circles around the identified objects or by any other suitable means. In one implementation, besides just identifying the objects, the mobile device may also tag the objects in the field of view of the camera. In one implementation, the display unit may display a representation of the total area visible to the lens. The device may draw a box on the display representing the image encompassing the region that the camera will store as an image or video. Additionally, the device may highlight the objects of interest for the user within the boxed area. For instance, the user may draw a box or any suitable shape around the object of interest or simply just select the identified or/and tagged object. In some embodiments, the user may also verbally select the object. For example, the user might give the mobile device a verbal command to "select Tom," where Tom is one of the tags for the tagged objects displayed on the display unit.

Figure 5A:
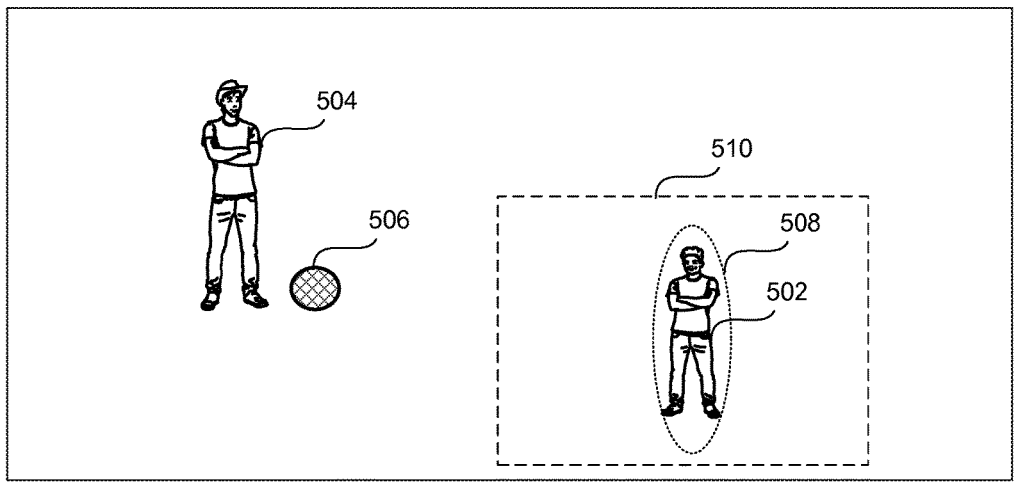
FIG. 5A and FIG. 5B illustrate an exemplary embodiment of the User Interface.
Figure 5B:
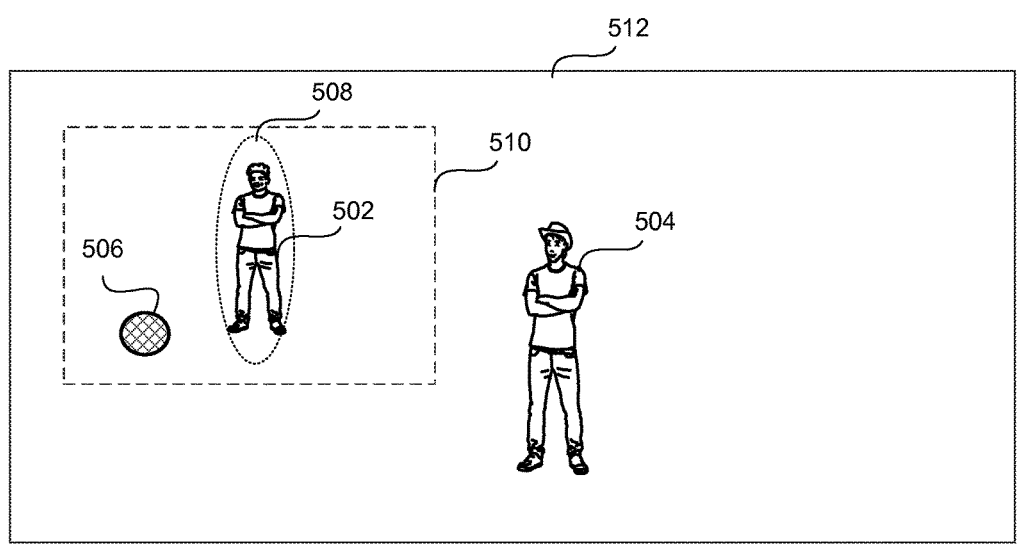

Briefly referring to FIGS. 5A and 5B, exemplary embodiments of an Event Mode such as that described above are illustrated. A particular person, designated here as a man 502, has been selected either during initiation of Event Mode or at a different time. The selection of the man 502, may be visually indicated, for example, by highlighting or circling 508 around the man 502. FIG. 5A shows an exemplary field of view visible to the camera 150 and displayed on the display unit 512 of the device at a first time. The device may use components similar to components described in reference to device 100 of FIG. 1. For example, the display unit may be an output device 120 and the identification of the man 502 and other objects in the field of view of the camera 150 may be performed using the processor 110 and instructions from the working memory 135. In FIG. 5A, two men (502 and 504) and a ball 506 are shown on the display unit of the device. The device identifies and tracks the person 502 over a course of time. On the display unit, the device may highlight the person 502, as shown in FIG. 5A by a circle (although many different techniques can be used). Additionally, the device may visually display the box 510 to indicate to the user particular content that may be acquired by the device if an image is acquired. The user interface may enable the user to select, reject or modify the identified objects. For instance, the user may be able to deselect one person 502 and select another person 504 using the touch screen.

FIG. 5B shows an exemplary field of view visible to the camera and displayed on the display unit 512 of the device at a second time. Both of the people (502 and 504) move in the field of view between the first time (as shown in FIG. 5A) and the second time (as shown in FIG. 5B). The device continues to track the person 502 present in the field of view and highlight the person 502 and the particular content around the person 502 that would be in an image acquired at the current time. In one setting, the device may consider the proximity of the person 502 to the ball 506 as a triggering event to obtain the image data.

Referring to the exemplary flow of FIG. 3 again, at block 306, the device automatically starts tracking the identified object present in the field of view over a period of time. The device may track the object for the duration of time that the Event Mode is enabled and as long as the object is within the field of view of the camera lens of the device. The device may track the object using known methods, such as optical flow tracking and normalized cross-correlation of interesting features or any other suitable methods in an area of interest. The camera may track the at least one object using one or more of a wide angled lens, zooming capabilities of the camera, a mechanical lens that allows the lens to pivot, the device placed on a pivoting tripod, a high resolution image or any other suitable means that allows the device to track the object over an area larger than the intended image/video size. A high resolution lens may allow for cropping-out low resolution pictures that include the objects of interest.

The Event Mode duration may be a configurable duration of time in one embodiment. In another embodiment, objects are identified and tracked by the device in the field of view of the camera upon detecting motion in the field of view of the camera. The duration of the time for the Event Mode may be based on motion in the field of view of the camera lens coupled to the device or sound in the vicinity of the mobile device. In yet another embodiment, the device may be left in an Event monitoring mode, wherein the device monitors triggering events or identifies objects of interest in low resolution. In one aspect, when an object of interest is identified, the device increases the resolution for taking higher resolution videos or pictures of the object. The device may switch to a higher resolution mode upon detecting motion in the field of view of the camera. Also, the device may switch to a sleep mode after detecting a pre-defined period of inactivity in an environment of the device.

In one embodiment, the image is acquired using a wide-angle lens. A wide-angle lens refers to a lens that has a focal length substantially smaller than the focal length of a normal lens for a given film plane. This type of lens allows more of the scene to be included in the photograph. An acquired image using a wide angle shot is usually distorted. The acquired image may be first undistorted before processing the image for tracking. The process of undistorting the image may include applying the inverse of the calibration of the camera to the image. Once the image is undistorted, the area of interest in the image is tracked and cropped according to embodiments of the invention.

In another embodiment, the device may use a lens capable of taking a high resolution picture covering a large area. This may allow tracking the object over a larger area. Area surrounding and including the identified object may be acquired at a lower, but acceptable, resolution. In one implementation, only a sampling of a subsection of the entire image including the object of interest is acquired for identification and tracking purposes. Sampling a subsection of the image may be advantageous, since it allows for better memory bandwidth management and lower storage requirements. In another implementation, the full image is acquired and processed at a later time.

Additionally, the device may be equipped with multiple cameras, lenses, and/or sensors for acquiring additional information. The additional cameras/sensors may allow for better identification and tracking of the object over a larger area or better sensing capabilities for identifying the object or the event.

At block 308, the device determines the particular content for the image from the field of view based on the identification and tracking of the object. The device may use techniques to better frame the object as part of the acquired image. For instance, the device may frame the object of interest in the center of the image, or use the "rule of thirds" technique. In other images, for instance, with a building in the background, such as a famous landmark and a person in the foreground of the image, the device may frame the image so that both the landmark and the person are properly positioned. As described before, the proper framing of the objects in the image may be accomplished by changing image processing and/or camera properties to acquire the desired content for the image.

At block 310, once the desired content for the image is determined, the device acquires the image data comprising the desired content. In one embodiment, the desired content is captured from the field of view. In another embodiment, the desired content is cropped out from a high resolution image already captured. In addition to recognizing the desired content, the device may identify certain triggering events in the field of view of the camera lens that are of interest to the user, once the object of interest is identified and tracking of the object is initiated. The device may acquire the image data for the desired content in response to detecting such triggering events. Triggering events of interest may be determined by analyzing the sensory input from the various input devices coupled to the mobile device, such as microphone, camera, and touch screen. A triggering event for acquiring image data could be characterized as a triggering event associated with an already identified object, or/and any object in the field of view. For example, a triggering event may include, but is not limited to, identification of an object of interest, movement of the object of interest, smiling of an identified person, dancing of the identified person, noise in the vicinity of the device and detecting a plurality of group members present from a group. For instance, if more than fifty percent of the people from the field of view belong to the user's extended family, the device may consider this occurrence as a triggering event. In another embodiment, a triggering event may also be associated with a movement or a change in the field of view. For instance, the moving of a soccer ball towards the goal post may be a triggering event. On the other hand, fireworks erupting in the field of view of the camera or a loud sound in the environment of the camera may also be identified as a triggering event by the device.

In one embodiment, the device tracks the objects and takes consecutive pictures. The device may acquire a plurality of images based on triggering events or detection of desired content. The device may post-process the images to keep only the most desirable pictures out of the lot while discarding the rest, wherein desirability of an image may be based on one or more of lighting conditions, framing of the at least one object, smile of at least one person in the image and detecting a plurality of group members present in the image from a group or any other such characteristics. Furthermore, if there are multiple pictures of the same object and background, the device may categorize the picture with the most number of smiles or a picture that fully captures the object as a better candidate for retaining than the other pictures. In another embodiment, the device may opportunistically take pictures of the object throughout the duration of time based on detecting triggering events in the field of view or vicinity of the mobile device and later categorize, rank and keep the most desirable pictures.

In one embodiment, the device acquires a video by continuously acquiring the image data comprising the at least one object over the period of time. The device may capture multiple images in quick succession and generate a video from the successive images.

It should be appreciated that the specific steps illustrated in FIG. 3 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 300.

Figure 6:
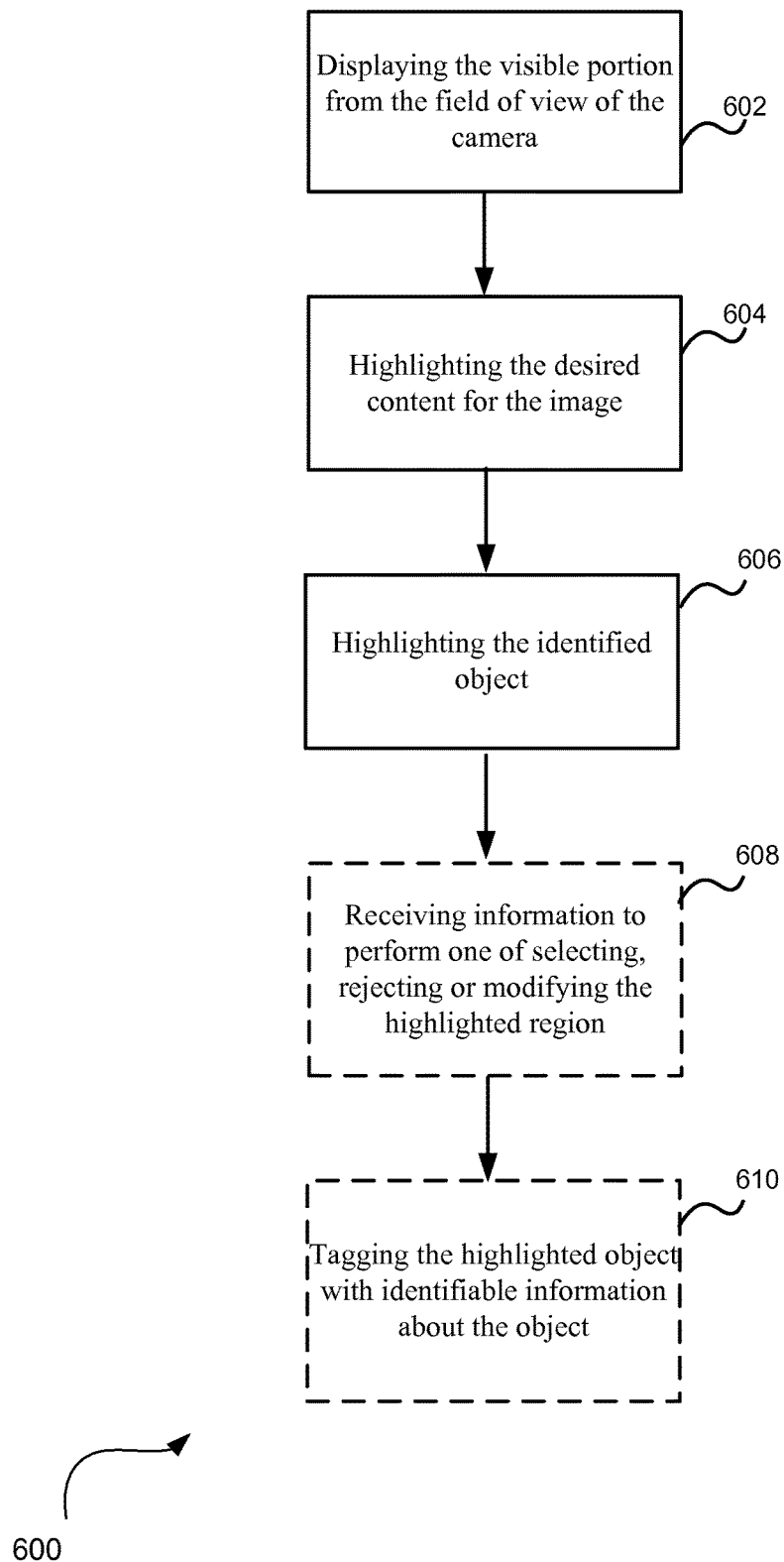
FIG. 6 is a simplified flow diagram, illustrating an exemplary method 600 for providing a User Interface for the user at the device.

FIG. 6 is a simplified flow diagram, illustrating a method 600 for providing a user interface for the user at the device. The method 600 is performed by processing logic that comprises hardware (circuitry, dedicated logic, etc.), software (such as is run on a general purpose computing system or a dedicated machine), firmware (embedded software), or any combination thereof. In one embodiment, the method 600 is performed by device 100 of FIG. 1.

Referring to FIG. 6, at block 602, the device displays the visible portion from the field of view of the camera on the display unit of the device. The display unit may be an output unit 120 as described in reference to device 100 of FIG. 1. At block 604, the device highlights the desired content of the image. The desired content may include an identified object. The desired content may be highlighted using a perforated rectangle or any other suitable means for highlighting the desired content. At block 606, the device highlights the identified object. The identified object may be highlighted using a circle or an oval around the identified object or using any other suitable means. Optionally, at block 608, the device receives information to perform one of selecting, rejecting or modifying the highlighted region. For instance, the user may realize that the device is selecting an object different from what the user desires. The user may touch a different object on the display unit. The display unit senses the input. The device receives the input from the display unit and selects the object indicated by the user. Along with the highlighted object, the image comprising the desired content also changes to present a picture with improved composition as the user selected the object as the focus of the image. Also optionally, at block 610, the device tags the highlighted object with identifiable information about the object, such as a user name so that the person is easily identifiable by the user.

It should be appreciated that the specific steps illustrated in FIG. 6 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 600.

Figure 7:
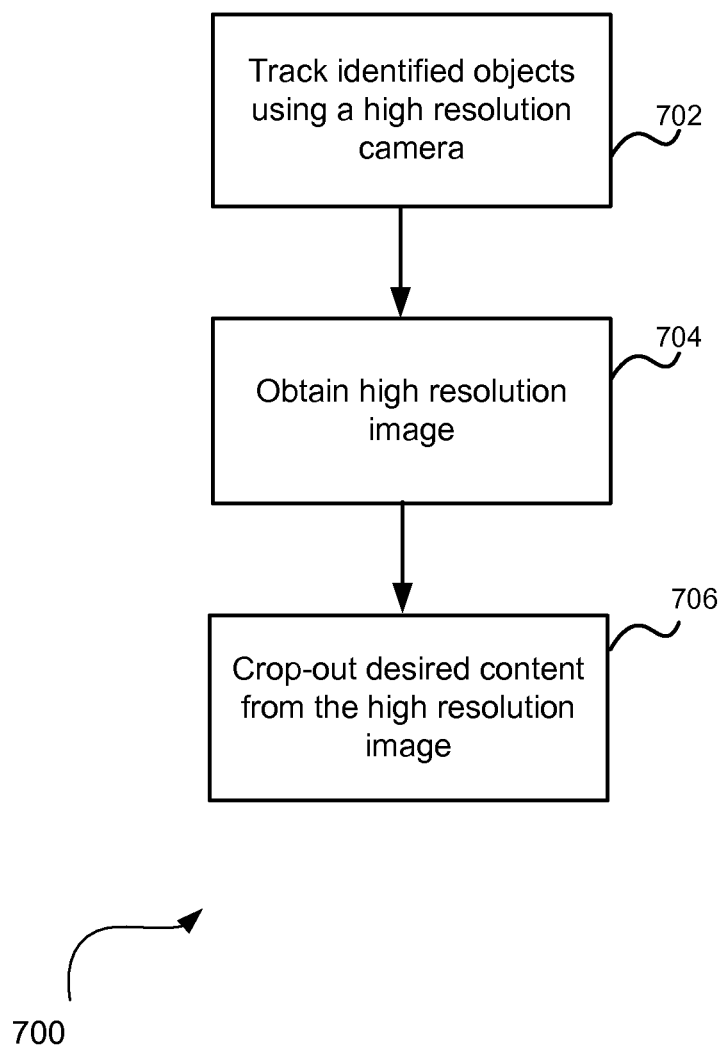
FIG. 7 is a simplified flow diagram, illustrating an exemplary method 700 for acquiring the desired content from a high resolution image.

FIG. 7 is a simplified flow diagram, illustrating a method 700 for acquiring the desired content from a high resolution image. The method 700 is performed by processing logic that comprises hardware (circuitry, dedicated logic, etc.), software (such as is run on a general purpose computing system or a dedicated machine), firmware (embedded software), or any combination thereof. In one embodiment, the method 700 is performed by device 100 of FIG. 1.

Referring to FIG. 7, at block 702, the device may track objects using a high resolution camera lens during at least parts of the Event Mode. Using a high resolution camera allows the device to track the object over an area larger than the intended image/video size. At block 704, the device may obtain high resolution images. At block 706, the device crops-out the desired content from the high resolution image. A high resolution lens may allow for cropping-out low resolution pictures that include the desired content including the objects of interest. In the process of cropping-out pictures, components of the device may balance the proportionality of the object that is being tracked with respect to the other objects in the image.

It should be appreciated that the specific steps illustrated in FIG. 7 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 700.

Figure 8:
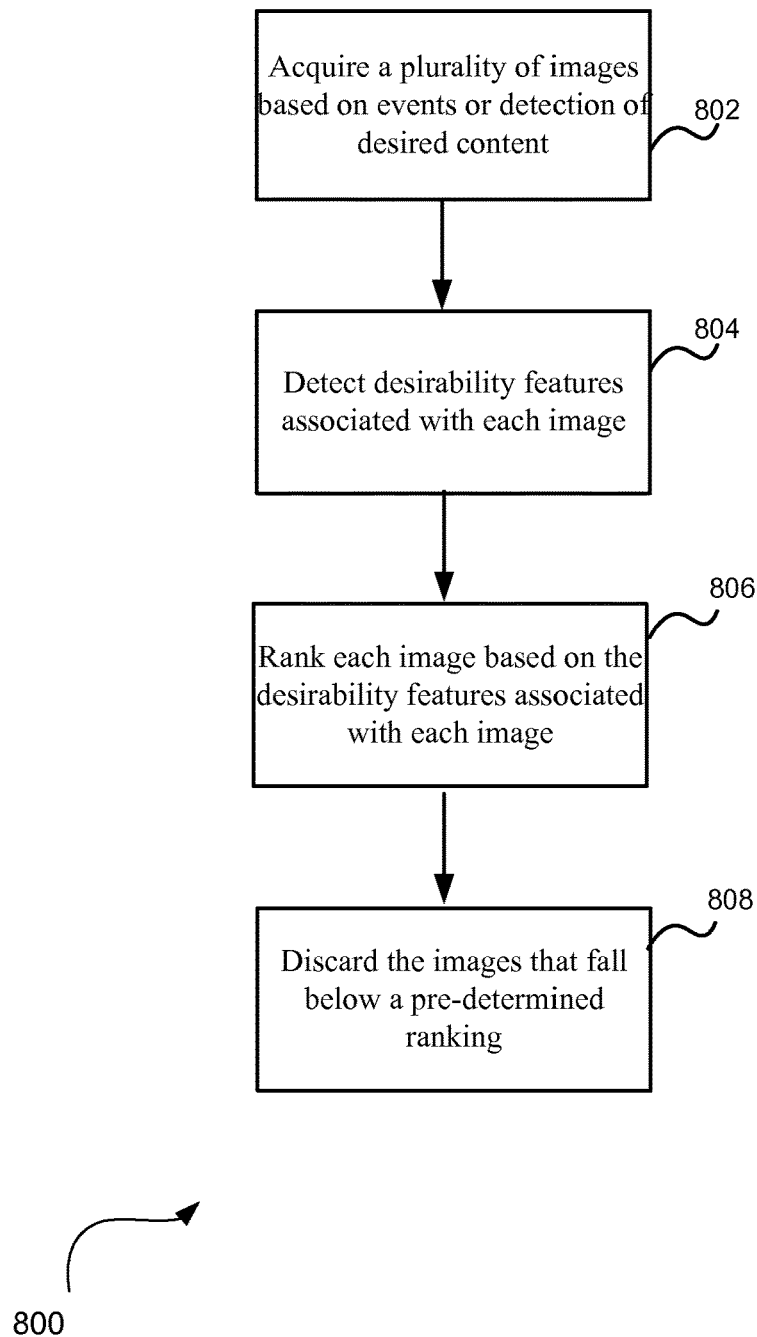
FIG. 8 is a simplified flow diagram, illustrating an exemplary method 800 for retaining desirable images.

FIG. 8 is a simplified flow diagram, illustrating a method 800 for retaining desirable images. The method 800 is performed by processing logic that comprises hardware (circuitry, dedicated logic, etc.), software (such as is run on a general purpose computing system or a dedicated machine), firmware (embedded software), or any combination thereof. In one embodiment, the method 800 is performed by device 100 of FIG. 1.

In one embodiment, components of the device track objects and acquire consecutive pictures. Referring to the exemplary flow diagram of FIG. 8, at block 802, the components of the device acquire a plurality of images based on triggering events or detection of desired content. At block 804, the device detects desirability features associated with each acquired image. At block 806, components of the device may rank each image based on the desirability features associated with each image, wherein desirability of an image may be based on one or more of lighting conditions, framing of the at least one object, smile of at least one person in the image, and detecting a plurality of group members present in the image from a group or any other such characteristics. At block 808, components of the device may post-process the images to keep only the most desirable pictures out of the lot while discarding the rest. Furthermore, if there are multiple pictures of the same object and background, the device may categorize the picture with the most number of smiles or a picture that fully captures the object as a better candidate for retaining than the other pictures. In another embodiment, the device may opportunistically take pictures of the object throughout the duration of time based on detecting triggering events in the field of view or vicinity of the mobile device and later categorize, rank and retain the most desirable pictures.

It should be appreciated that the specific steps illustrated in FIG. 8 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 800.

Figure 9:
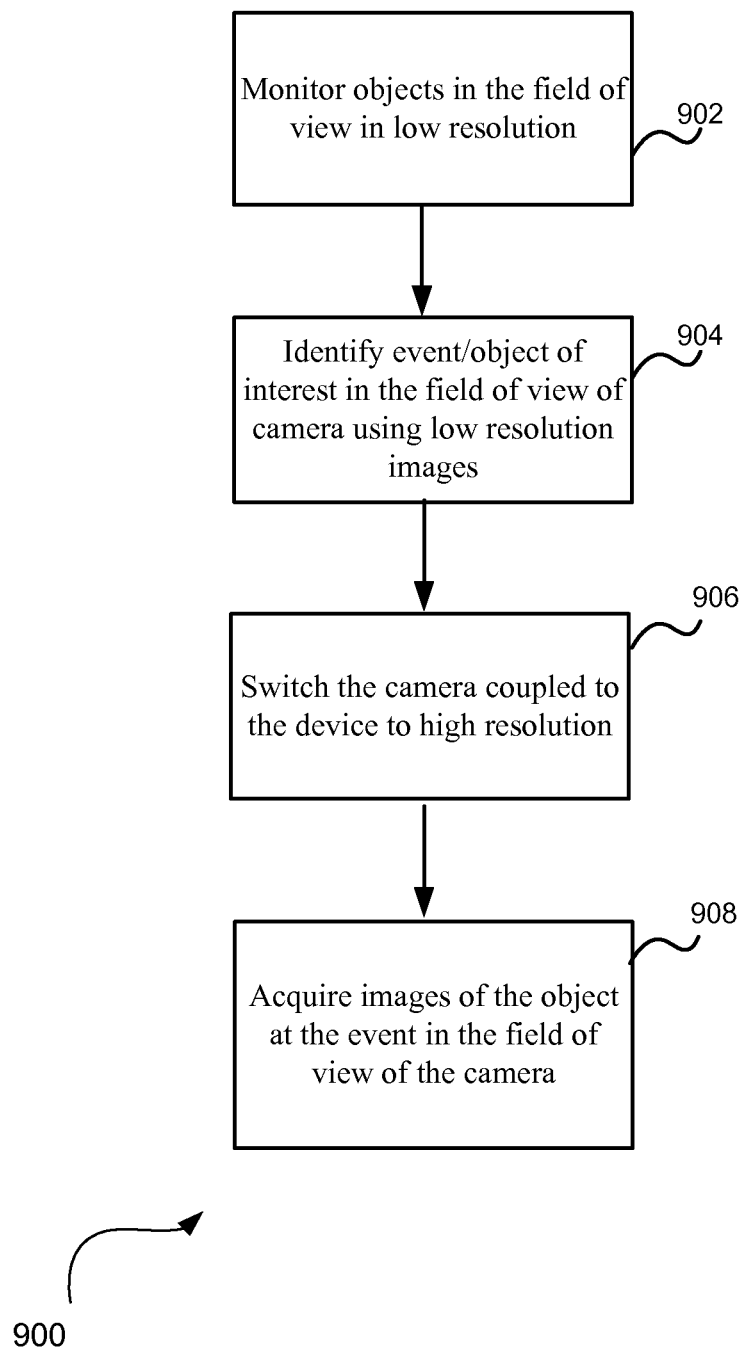
FIG. 9 is a simplified flow diagram, illustrating an exemplary method 900 for switching from low resolution to high resolution for acquiring images.

FIG. 9 is a simplified flow diagram, illustrating a method 900 for switching from low resolution to high resolution for acquiring images. The method 900 is performed by processing logic that comprises hardware (circuitry, dedicated logic, etc.), software (such as is run on a general purpose computing system or a dedicated machine), firmware (embedded software), or any combination thereof. In one embodiment, the method 900 is performed by device 100 of FIG. 1.

In one embodiment, the mobile device may be left in an Event monitoring mode, wherein the device monitors triggering events or identifies objects of interest in low resolution. The device may switch to a high resolution mode upon detecting motion in the field of view of the camera. Referring to the exemplary flow of FIG. 9, at block 902, components of the device may monitor objects in the field of view in low resolution. At block 904, components of the device may identify triggering events or objects of interest in the field of view of the camera using low resolution images. At block 906, the camera coupled to the device switches to high resolution upon detection of objects of interest in the field of view of the camera. At block 908, components of the device acquire images of the object at the triggering event in the field of view of the camera in the high resolution mode. Also, in some embodiments, the device may switch to a sleep mode after detecting a pre-defined period of inactivity in an environment of the device. A sleep mode may include turning off portions of the device or switching numerous components of the device to a low power state. For example, after a period of inactivity the device may switch off the device display unit.

It should be appreciated that the specific steps illustrated in FIG. 9 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 900.

Figure 10:
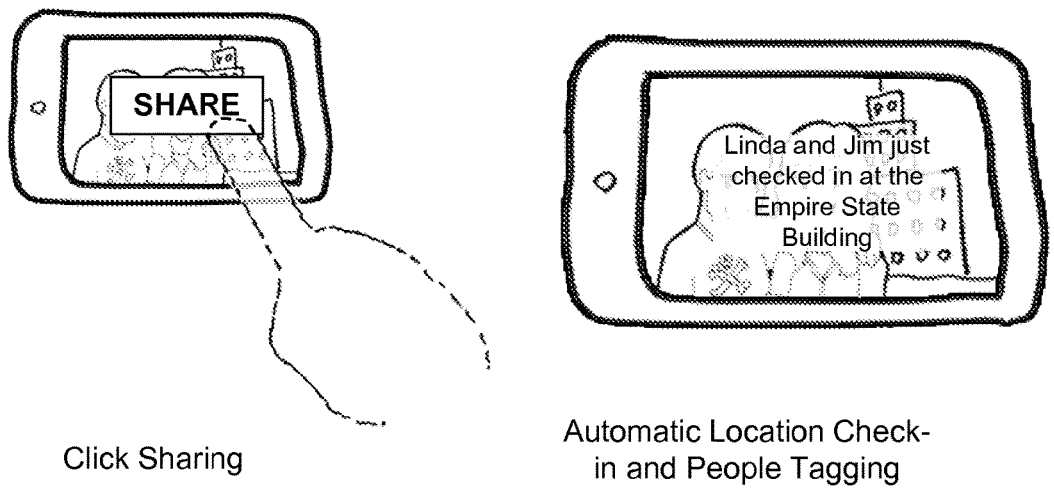
FIG. 10 illustrates an exemplary embodiment performed by components of the device for sharing images.

FIG. 10 shows an exemplary embodiment for acquiring and sharing pictures through use of a device such as device 100 described in FIG. 1. Right after the user acquires a picture; the device annotates the picture and makes a recommendation for sharing the picture. The recommendation provided by the device may be based on detecting the location of the device, people in the picture, and/or other sharing attributes of the objects in the picture and the image itself. For example, the device can detect the location by recognizing the objects in the image. If the background has the Empire State Building, the device knows with a fair amount of certainty that the location of the device is New York City. In some implementations, embodiments of the invention may detect the location by recognizing multiple objects in the image. For instance, if there is a Starbucks, McDonalds, and a "smile for tourist" billboard, then the location is the arrival gate at the CDG airport in France. In addition to or in conjunction with recognizing the background in the image, the device may also determine the location based on the signal strength of the mobile device to the servicing tower or by using a GPS system. After identification of the different objects in the image and deducing of the sharing attributes, the device may provide the user with information assisting the user with sharing information over a network. In FIG. 10, the device annotates the image for the user and asks if the user would like to share the picture or other information about the user. If the user affirms, the device may share the information about the user. For instance, the device may "check-in" the user at a location, such as the Empire State Building, in a social network such as Four-Square®.

Figure 11:
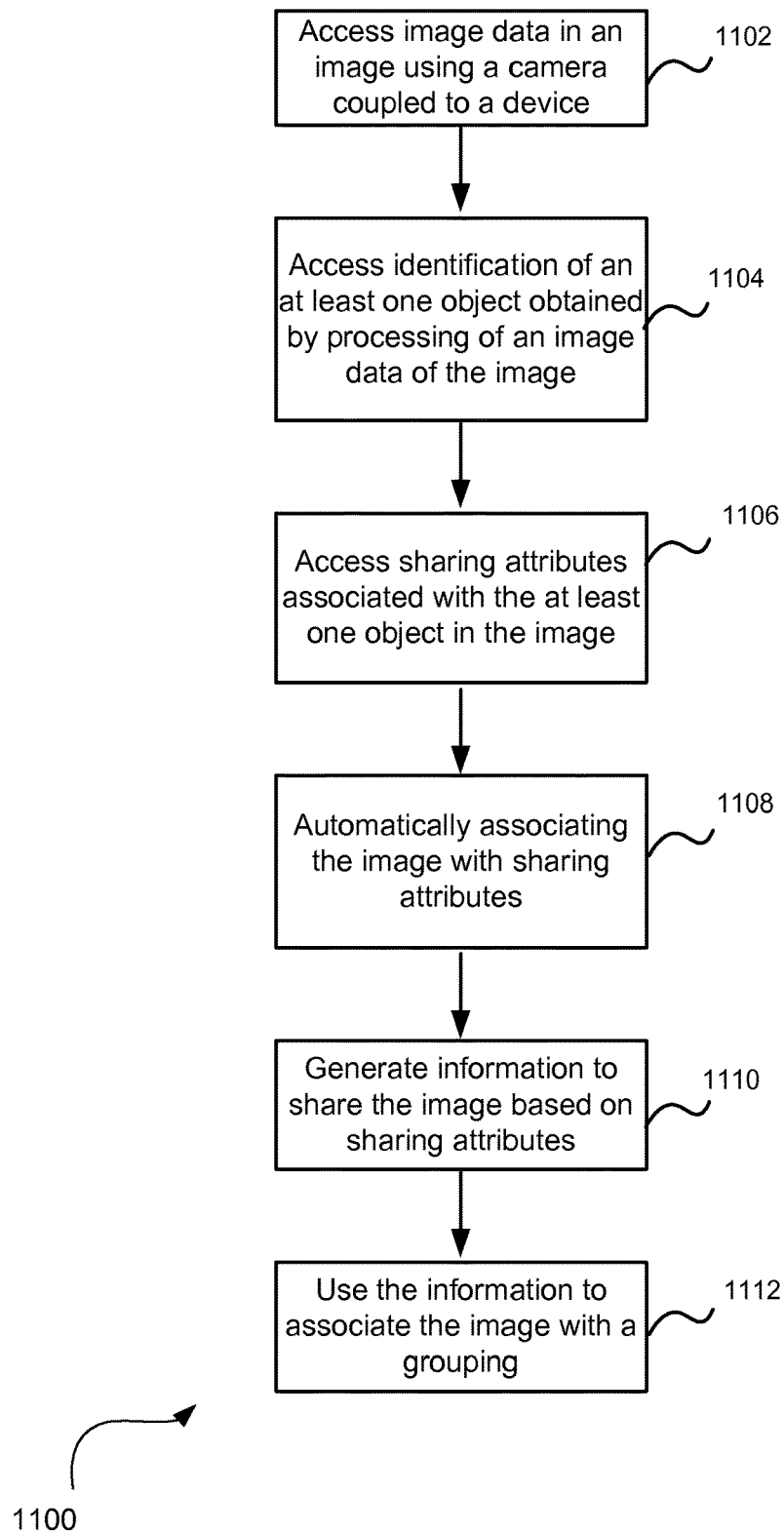
FIG. 11 is a simplified flow diagram, illustrating an exemplary method 1100 for sharing images over a network.

FIG. 11 is a simplified flow diagram, illustrating a method 1100 for accessing and sharing image data. The method 1100 is performed by processing logic that comprises hardware (circuitry, dedicated logic, etc.), software (such as is run on a general purpose computing system or a dedicated machine), firmware (embedded software), or any combination thereof. In one embodiment, the method 1100 is performed by a device 100 of FIG. 1.

Referring to the exemplary flow of FIG. 11, at block 1102, the device accesses image data in an image from a field of view of a camera coupled to the device for identifying one or more objects present in the field of view of the device. In one embodiment, the device is a mobile device. In some implementations, the data may be a representation of the entire field of view visible to the camera lens or a representation of a portion of the field of view visible to the camera lens of the camera coupled to the device.

At block 1104, the device accesses an identification of at least one object. The device may access the identification of the object from a local storage. Identification information regarding the objects from the image is obtained by processing of the data accessed at block 1102. In some implementations, the identification of an object is performed using a low resolution representation of the object. The processing of the data to identify the one or more objects from the data may be performed locally at the device or remotely using network resources, such as a remote server. When the identification of the object occurs at a remote server, the device transmits data to the remote server for processing of the data for the identification of one or more objects, and receives the identification of the object for sharing image data. Details of processing the image data using a server are further discussed in FIG. 12. Alternatively, the device may use locally stored data from a local database for identifying an object. In one embodiment, the device accesses an internal database stored on the device before accessing an external database belonging to a network resource for identifying the at least one object. In other embodiments, the internal database is a subset of the external database. For instance, the internal database may be implemented as a cache storing the most recently accessed information.

The device accesses identification information about one or more objects of interest visible to the camera. In one aspect, identification of the at least one object may include generating a representation of a portion of the image associated with the object using some or all of the data visible to the camera and comparing the representation of a portion of the image to a representation of a reference object stored in a database. In some instances, the object of interest is a person and facial recognition techniques are used in identifying a portion of the image associated with the at least one object comprising a face of the person. Known facial recognition techniques such as Principal Component Analysis, Linear Discriminate Analysis, Elastic Bunch Graph Matching or any other suitable techniques may be used for facial recognition.

The faces of the people in the field of view may be compared against faces from images stored locally on the device. In addition, the device may be connected to network resources using a wireless connection such as WiFi, Wimax, LTE, CDMA, GSM connection or any other suitable means. In some instances, the device may also be connected to network resources through a wired connection. The device may have access to identification information in the field of view of the camera using a social network accessible through the network resources. The device may use the user's relationships or/and digital trust established and accessible through the user's social network. For instance, the device may access the user's social networks and facilitate matching the obtained representations of the image to the representations of the reference images from social networks like Facebook® and LinkedIn®.

A social network or social group may be defined as an online service, platform, or site that focuses on facilitating the building of social networks or social relations among people who, for example, share interests, activities, backgrounds, or real-life connections. A social network service may consist of a representation of each user (often a profile), his/her social links, and a variety of additional services. Most social network services are web-based and provide means for users to interact over the Internet, such as e-mail and instant messaging.

Aspects of using a remote server for identification of the object are further discussed with reference to FIG. 12. Facial recognition may not be limited to people and may include facial recognition for animals. For instance, social networking websites have accounts dedicated to pets. Therefore, identifying facial features for facial recognition may include facial and other features for animals.

As discussed earlier, the device may use a hierarchical system for efficiently identifying objects in the field of view of the camera lens against stored images. For instance, if the user's brother enters the field of view, the mobile device may have a stored image of the user's brother in any of local storage media, a cache or memory. The device may be loaded with the most relevant objects of interest to the user by the device. On the other hand, there may be situations where an infrequently visited friend from high school who is only connected to the user through Facebook® shows up in front of the camera lens. In such a scenario, the device may search the local storage, cache and memory and may not identify the person using the local resources. The mobile device may connect to a social network using the network resources to identify the face against the user's social network. In this instance, the device will facilitate finding the user's friend through her/his connections in Facebook®.

In another embodiment, identification of the object may include accessing an at least one characteristic associated with the at least one object, and determining the identification of the at least one object based on the at least one characteristic associated with the at least one object. For example, during a soccer match, the mobile device may be able to identify a soccer ball and track the soccer ball on the field based on the dimensions and characteristics of the soccer ball or/and by partially matching the soccer ball to a stored image.

Once one or more objects are identified in the field of view of the camera lens, the device may provide a user interface for the user to select, reject or modify the identified objects. The user interface may involve providing an interface to the user using a display unit coupled to the mobile device. The display unit could be a capacitive sensory input such as a "touch screen." In one embodiment, the mobile device may highlight the identified objects by drawing boxes or circles around the identified objects or by any other suitable means. In one implementation, besides just identifying the objects, the mobile device may also tag the objects in the field of view of the camera. In one implementation, the display unit may display a representation of the total area visible to the lens. Additionally, the device may highlight the objects of interest for the user within the boxed area. For instance, the user may draw a box or any suitable shape around the object of interest or simply just select the identified or/and tagged object. If the objects are tagged, the user may also verbally select the tag. For example, the user might give the mobile device a verbal command to "select Tom," where Tom is one of the tags for the tagged objects displayed on the display unit.

Referring back to the exemplary flow of FIG. 11, at block 1106, the device accesses sharing attributes associated with the at least one object identified in the image. The sharing attributes may be derived remotely using network resources, locally using the device resources or any combination thereof. The sharing attributes may be derived using one or more characteristics of the object. For instance, images with a building structure may be tagged with a sharing attribute of "architecture" or "buildings" and images with flowers may be tagged with a sharing attribute of "flowers." The sharing attributes may be at different granularities and configurable by the user. For instance, the user may have the ability to fine tune the sharing attributes for buildings to further account for brick-based buildings as opposed to stone-based buildings. Furthermore, an image may have several objects and each object may have several attributes.

In some embodiments, the sharing attributes are assigned to the objects based on the people present in the image. The object as discussed above may be a subject/person. The person's face may be recognized using facial recognition at block 1104. As an example, for an image with mom's picture, the object may have sharing attributes such as "family" and "mother." Similarly, friends may be identified and associated with sharing attributes as "friends." The sharing attributes may also be derived using a history of association of similar objects for the objects identified. For instance, if the device detects that the user always associates/groups a very close friend with his or her family, then the device may start associating that friend as having a sharing attribute as "family."

At block 1108, the sharing attributes are automatically associated with the image. In one embodiment, at block 1106, the sharing attributes are individually associated with the object and may not be inter-related with sharing attributes of other objects or attributes of the image itself. In one embodiment, numerous sharing attributes from the different objects and image attributes may be combined to generate a fewer number of sharing attributes. In some embodiments, the sharing attributes associated with the image are more closely aligned with groupings of pictures created for accounts such as Facebook®, Twitter®, and Google Plus® by the user.

Embodiments of the invention may use the relationship between the different object and the objects and the attributes of the image to refine the sharing attributes for the image. This may include taking into account the context of the picture in determining the sharing attributes. For instance, for all pictures taken for the Jul. 4th weekend in 2012 in Paris for a couple, the mobile device or the server may automatically associate a sharing attribute that represents "Jul. 4th weekend, 2012, Paris" with a plurality of images. The sharing attribute for the image may result from taking into account the date, time and location of where the image was captured. In addition, objects in the image such as facial recognition of the couple and the Eiffel Tower in the background may be used. The location may be detected by inferring the location of objects such as the Eiffel Tower in the background or using location indicators from a GPS satellite or a local cell tower.

Sharing attributes may also include sharing policies and preferences associated with each object identified in the image. For instance, if a person is identified in the image, then the person might be automatically granted access rights or permission to access the image when the image is uploaded to the network as part of a social network or otherwise. On the other hand, the user may also have sharing policies, where, if the image has mom in it, the user may restrict the picture from being shared in groupings with friends.

Embodiments may also employ the user's relationships or/and digital trust established and accessible through the user's social group or network in forming the sharing attributes. In some implementations, the trust is transitive and includes automatically granting to a second person access rights to the image based on a transitive trust established between the first person and the second person using a first trust relationship between the first person and a user of the device and a second trust relationship between the second person and the user of the device. For example, if the identified person in the image is the device user's father, then the embodiments of the image may grant to the device user's grandfather access rights to the image.

Similarly, embodiments of the invention may use group membership to grant access rights to an image. For instance, if more than a certain number of people identified in the image belong to a particular group on a social network 408, then embodiments of the invention may grant to other members belonging to the same group access to the image. For instance, if the user had a Google circle for family members and if most of the people identified in the image are family members, embodiments of the device may share or grant to all the members of the family Google circle access rights to the image.

At block 1110, information is generated to share the image based on sharing attributes. In one embodiment, information is generated associating the image with one or more social networks 408, groups or circles based on the sharing attributes of the image. In another embodiment, information is generated associating the image with a grouping of objects stored locally or on a server as part of the network 404. The image information may also include identifying information from block 1104 and sharing attributes from block 1106 and 1108.

In some implementations, the identification and sharing attributes for the image may be stored with the image as metadata. At block 1112, at the device, the information generated may be displayed to the user on the display unit of the output device 120 from FIG. 1. For instance, the image may be displayed with annotations that include the identification information and sharing attributes for the object or the image as a whole. Furthermore, the device may provide the user with recommendations for uploading the image to one or more social networks 408 or groupings online. For instance, for pictures with colleagues at an office party, the device may recommend loading the pictures to a professional social network 408 such as LinkedIn®. Whereas, for pictures from a high-school reunion party, the device may recommend uploading the pictures to a social network 408 like Facebook® or a circle dedicated to friends from high school in a social network 408 like Google Plus®.

It should be appreciated that the specific steps illustrated in FIG. 11 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1100.

Figure 12:
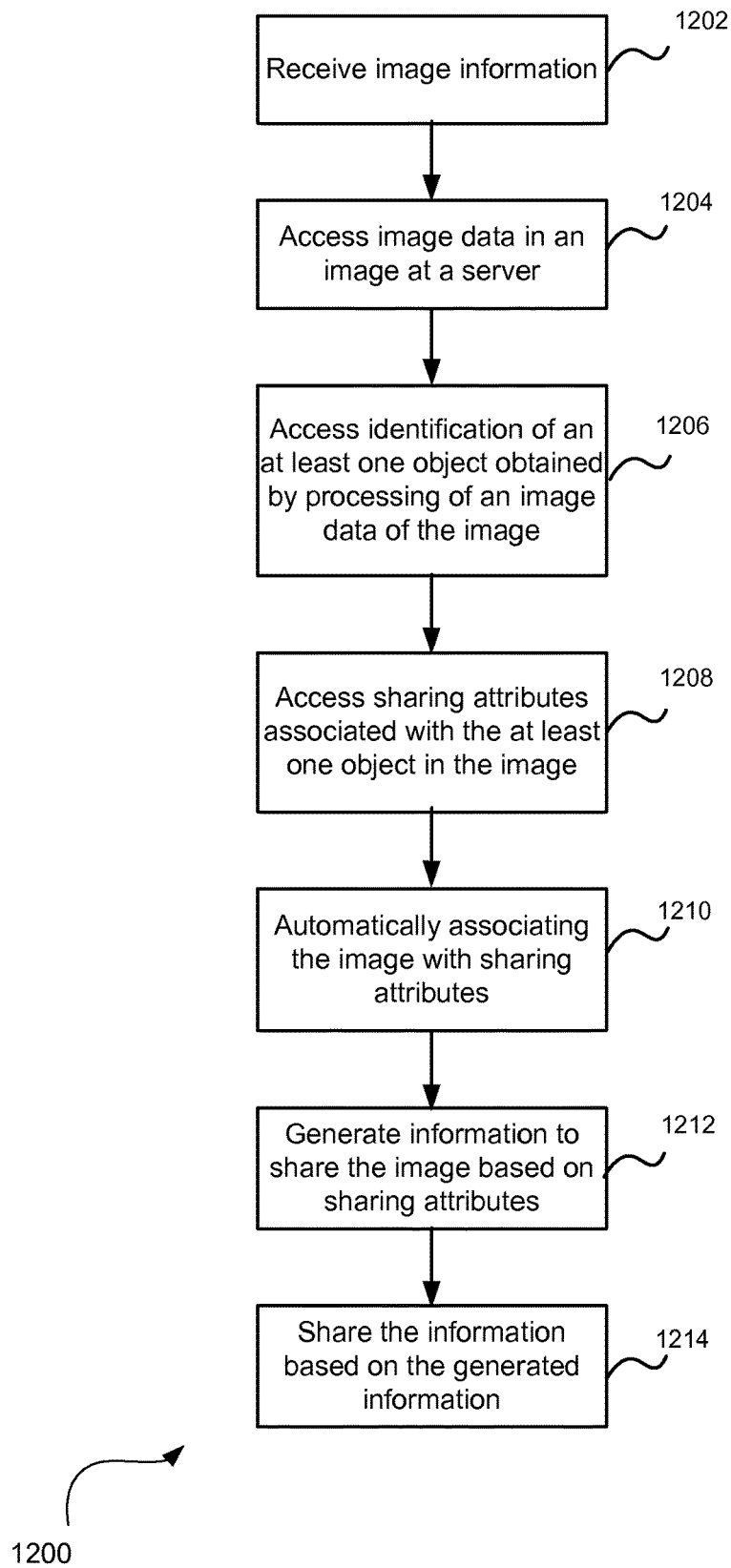
FIG. 12 is another simplified flow diagram, illustrating an exemplary method 1200 for sharing images over a network.

FIG. 12 is a simplified flow diagram, illustrating a method 1200 for accessing and sharing image data. The method 1200 is performed by processing logic that comprises hardware (circuitry, dedicated logic, etc.), software (such as is run on a general purpose computing system or a dedicated machine), firmware (embedded software), or any combination thereof. In one embodiment, the method 1200 is performed by a device 100 of FIG. 1 that represents a server 410 in FIG. 4

Referring to the oversimplified and exemplary of FIG. 4 again, the server 410 may be accessible by a device 402 (also device 100 from FIG. 1) such as a mobile device, camera device or any other device by accessing the network 404 through the network resources. The device discussed with reference to FIG. 11 may represent such a device 402. Network resources may also be referred to as the "cloud."

In one implementation, at block 1202, the server may receive the image data from a device 402 and store it locally before processing (using processor 110 from FIG. 1) the image data before proceeding with block 1204. The image data may be the full image of that which is visible to the lens, a portion of the image, or a representation of the image with much lower resolution and file size for identification before receiving the final image for sharing. Using a representation of the image with a smaller size than the final image has the advantage of potentially speeding up the process of detecting the individuals in the pictures using lower bandwidth. Optionally, the camera 150 may also crop the image to reduce the file size before sending the image data to the server for further processing. In one embodiment, the image is cropped by cropping out almost all the pixel information in the area surrounding the objects or faces of the people in the picture to reduce the file size. In another embodiment, each object or face is detected and cropped out into a separate image file to further reduce the total size of the files representing the faces. In such an implementation, the server may perform identification (block 1206), generation of sharing attributes (1208 and 1210) and generation of sharing information (block 1212) using the image data comprising the low resolution picture or the partial representation. However, the actual sharing of the image (block 1214) may occur using a final image with higher resolution picture obtained from the device 402. The server may receive the image data directly from the device 402 obtaining the picture or through another device such as a computer, database or any other source.

At block 1204, the server may access the image data in an image at the server. After receiving the image data acquired by device 402/100 using the camera 150, the server may store the image data temporarily in working memory or in a storage device for accessing and processing of the data by the server. At block 1206, the server may access identification of one or more objects obtained by processing the image data of the image. For identifying the objects the server may have access to a local database or to one or more remote database(s) 406. In addition to databases, the server may have access to the user's accounts at websites such as Facebook®, LinkedIn®, Google Plus®, and any other website that may store information such as images for the user. In one implementation, the server may identify the objects from the image by comparing a representation of the object from the image with a representation of a reference object stored in the database. In another implementation, the server may access characteristics associated with the object and determine the identity of the object based on the characteristics of the object. The object may be a person, wherein facial recognition techniques may be used to identify the person. As briefly discussed before, the identification of the object may be performed using a low resolution representation of the object. In some embodiments, the components of the server are implemented using components similar to FIG. 1.

At block 1208, the server may generate and access sharing attributes for the objects from the image. As described in reference to 1106, the server may generate the sharing attributes based on a history of association of similar objects, characteristics of the objects and facial recognition of the people in the image. At block 1210, the server may automatically associate the image with sharing attributes. The server may also further refine the sharing attributes by using other contextual information about the image such as the date, time and location of where the image was captured.

At block 1212, the server may generate information to share the image based on the sharing attributes. In one instance, the server may use the sharing attributes associated with an image and compare the sharing attributes to a plurality of different groupings that the user may be associated with. For example, the user may have Twitter®, Google®, LinkedIn®, Facebook® and MySpace®, Flicker® and many other such accounts that store and allow sharing of pictures for the users and other information. Each account may be related to different personal interests for the user. For instance, the user may use LinkedIn® for professional contacts, MySpace® for music affiliations and Facebook® for high school friends. Some groupings may have further sub-categories, such as albums, circles, etc. The server may have permissions to access these groupings or social media networks on behalf of the user for the purpose of finding the most appropriate recommendations for the user to associate the pictures with. The server may include the identification attributes and the sharing attributes for the image in the generated information. At block 1214, the server may share the image with one or more groupings based on the generated information.

In one embodiment, the server receives the image or the image data from a device 402 (also 100 from FIG. 1) with a camera 150 coupled to the device 402 at block 1202. The server performs embodiments of the invention as described with reference to FIG. 12. The server generates the information that may include the different groupings to associate the image with, the identification attributes and the sharing attributes. The server may include this information as metadata for the image. The server may send the image and the information associated with the image such as metadata to the device used by the user. The device 402 may display and annotate the image with identification information and sharing attributes. The device may also display the different grouping recommendations to associate the image with the user. The user may confirm one of the recommendations provided or choose a new grouping to associate the image with. The device 402 may relay the user's decision either back to the server or directly to the network hosting the grouping to share the image. At block 1214, in one embodiment, the server may directly share the image with the appropriate grouping without further authorization from the user.

In another embodiment, the device 402 starts the identification process before the actual capture of the image using the processor 110 from FIG. 1. This has the advantage of potentially speeding up the process of detecting the individuals in the pictures. The device 402 detects one or more faces in the frame of the field of view of the lens of the device 402. The device 402 acquires a frame of the image. In one embodiment, the frame of the actual image is a partial representation of the image. The partial representation of the image has enough pixel information to start the identification process before the actual picture is taken. Optionally, the device 402 may also crop the image to reduce the file size before sending the image to the cloud for further processing. In one embodiment, the image is cropped by cropping out almost all the pixel information in the area surrounding the faces of the people in the picture to reduce the file size. In another embodiment, each face is detected and cropped out into a separate image file to further reduce the total size of the files representing the faces.

Once the files are prepared, the device 402 sends the files containing the face images to a server in the cloud. The server identifies the faces and returns the results to the device. If any new faces enter the field of view of the camera the device repeats the procedure of identifying the face only for that new person. As people move in and out of the field of view, the camera also builds a temporary database of the images and the associated annotation data. For instance, if a person leaves the field of view and re-enters the field of view of the lens of the device, the device does not need to query recognition of the face from the cloud. Instead, the device uses its local database to annotate the image. In some embodiments, the device may also build a permanent local or remote database with the most queried faces before querying a third party network. This could allow for faster recognition by the camera of faces for frequently photographed individuals like close family and friends. These embodiments for identifying faces use local and remote databases that may be used in conjunction with other modes like tracking discussed before. Once the faces are identified, the captured picture could be presented to the user with the annotations.

It should be appreciated that the specific steps illustrated in FIG. 12 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1200.

Embodiments of the invention performed by the components of the device may combine features described in various flow diagrams described herein. For instance, in one exemplary implementation, the device may track the object as described in FIG. 3 and share the image data including the object using features from FIG. 11 or FIG. 12, or any combination thereof.

What is claimed is:
1. A method for sharing pictures using a device, the method comprising:
    accessing image data for an image;

accessing an identification of at least one object obtained by processing the image data for the image;

accessing sharing attributes associated with the at least one object based on the identification of the at least one object in the image, wherein the sharing attributes indicate to whom the image is to be shared rather than identifying the at least one object;

automatically associating the image with the sharing attributes accessed based on the identification of the at least one object;

generating information to share the image based on the sharing attributes; and sharing the image based on the generated information.

2. The method of claim 1, wherein accessing the identification of the at least one object comprises:

generating a first representation of at least a portion of the image associated with the at least one object using some or all of the image data; and comparing the first representation to a second representation of a reference object stored in a database.

3. The method of claim 2, wherein the at least one object is a person and wherein a facial recognition is used in accessing the identification of the at least one object.

4. The method of claim 2, wherein the database is one of an internal database stored on the device or an external database belonging to a network resource.

5. The method of claim 1, wherein accessing the identification of the at least one object comprises:

accessing at least one characteristic associated with the at least one object; and determining the identification of the at least one object based on the at least one characteristic associated with the at least one object.

6. The method of claim 1, wherein accessing the identification of the at least one object is performed using a low resolution representation of the at least one object.

7. The method of claim 1, further comprising associating the image with a social network based on the sharing attributes.

8. The method of claim 1, further comprising associating the image with a grouping of objects within a social network based on the sharing attributes.

9. The method of claim 1, wherein the sharing attributes are derived using one or more of a location at which the image was captured, a time at which the image was captured, a history of association of similar objects for the at least one object identified, a characteristic of the at least one object, a facial recognition of people in the image, a relationship of a user of the device with a grouping of objects within a social network, and a digital trust between the user of the device and the grouping of objects within the social network.

10. The method of claim 1, wherein the at least one object is a first person.

11. The method of claim 10, further comprising automatically granting access rights to the first person using network resources.

12. The method of claim 10, further comprising automatically granting access rights to the image to a second person using network resources based on a transitive trust established between the first person and the second person using a first trust relationship between the first person and a user of the device and a second trust relationship between the second person and the user of the device.

13. The method of claim 10, further comprising automatically granting access rights to the image to a group of people using network resources based on an association of the first person with the group of people.

14. The method of claim 1, wherein accessing the identification of the at least one object obtained by processing the image data for the image occurs at the device.

15. The method of claim 1, wherein sharing the image further comprises:

receiving the image data for the image from the device at a server using network resources; and sending information for sharing the image based on the sharing attributes from the server.

16. The method of claim 1, further comprising providing a user with a user interface to enable the user to highlight the at least one object displayed on a display unit of the device.

17. The method of claim 16, further comprising receiving input using the user interface to perform one or more of selecting, rejecting or modifying the highlighted object.

18. The method of claim 16, further comprising tagging the highlighted object with identifiable information about the at least one object.

19. The method of claim 16, further comprising providing the user with a list comprising at least one association based on the sharing attributes.

20. The method of claim 16, further comprising providing the user with the user interface to share the image by associating the image with other groupings of objects based on the sharing attributes using network resources.

21. The method of claim 1, further comprising:

ranking the image based on desirability features associated with the image, wherein the desirability features associated with the image include one or more of lighting conditions, framing of the at least one object, smile of at least one person in the image, or detecting a plurality of group members present in the image from a group; and discarding the image if the ranking of the image falls below a pre-determined ranking.

22. The method of claim 1, further comprising:

combining or refining the sharing attributes accessed based on the identification of the at least one object to generate a fewer number of sharing attributes.

23. The method of claim 1, wherein the sharing attributes include one or more of sharing policies or preferences associated with the at least one object.

24. The method of claim 1, further comprising:

storing at least one of the identification of the at least one object or the sharing attributes with the image as metadata.

25. The method of claim 1, further comprising:

providing recommendations for uploading the image to one or more social networks or groupings online.

26. A device, comprising:

a camera configured to capture images;

a display unit configured to display the captured images;

a processor coupled to the camera and the display unit; and a non-transitory computer readable storage medium coupled to the processor, wherein the non-transitory computer readable storage medium stores machine-readable instructions, and wherein the instructions, when executed by the processor, cause the processor to:

access image data for an image captured by the camera;

access an identification of at least one object obtained by processing the image data for the image;

access sharing attributes associated with the at least one object based on the identification of the at least one object in the image, wherein the sharing attributes indicate to whom the image is to be shared rather than identifying the at least one object;

automatically associate the image with the sharing attributes accessed based on the identification of the at least one object;
generate information to share the image based on the sharing attributes; and
share the image based on the generated information.

27. The device of claim 26, wherein the instructions, when executed by the processor, cause the processor to:
generate a first representation of at least a portion of the image associated with the at least one object using some or all of the image data; and
compare the first representation to a second representation of a reference object stored in a database to access the identification of the at least one object.

28. The device of claim 26, wherein the instructions, when executed by the processor, cause the processor to:
access at least one characteristic associated with the at least one object; and
determine the identification of the at least one object based on the at least one characteristic associated with the at least one object to access the identification of the at least one object.

29. The device of claim 27, wherein the at least one object is a person and wherein a facial recognition is used to access the identification of the at least one object.

30. The device of claim 27, wherein the database is one of an internal database stored on the device or an external database on a network resource.

31. The device of claim 26, wherein the instructions, when executed by the processor, cause the processor to access the identification of the at least one object using a low resolution representation of the at least one object.

32. The device of claim 26, wherein the instructions, when executed by the processor, cause the processor to associate the image with a social network based on the sharing attributes.

33. The device of claim 26, wherein the instructions, when executed by the processor, cause the processor to associate the image with a group of objects within a social network based on the sharing attributes.

34. The device of claim 26, wherein the instructions, when executed by the processor, cause the processor to derive the sharing attributes based on one or more of a location at which the image was captured, a time at which the image was captured, a history of association of similar objects for the at least one object identified, a characteristic of the at least one object, and a facial recognition of people in the image.

35. The device of claim 26, wherein the at least one object is a first person.

36. The device of claim 35, wherein the instructions, when executed by the processor, cause the processor to automatically grant access rights to the first person using network resources.

37. The device of claim 35, wherein the instructions, when executed by the processor, cause the processor to automatically grant access rights to the image to a second person using network resources based on a transitive trust established between the first person and the second person using a first trust relationship between the first person and a user of the device and a second trust relationship between the second person and the user of the device.

38. The device of claim 35, wherein the instructions, when executed by the processor, cause the processor to automatically grant access rights to the image to a group of people using network resources based on an association of the first person with the group of people.

39. The device of claim 26, wherein the instructions, when executed by the processor, cause the processor to process the image data for the image occurs at the device so as to access the identification of the at least one object.

40. The device of claim 26, wherein the instructions, when executed by the processor, cause the processor to:
receive the image data for the image from the device at a server using network resources; and
send information for sharing the image based on the sharing attributes from the server to share the image.

41. The device of claim 26, wherein the instructions, when executed by the processor, cause the processor to provide a user with a user interface to enable the user to highlight the at least one object displayed on the display unit of the device.

42. The device of claim 41, wherein the instructions, when executed by the processor, cause the processor to receive input using the user interface to select, reject, or modify the highlighted object, or any combination thereof.

43. The device of claim 41, further comprising tagging the highlighted object with identifiable information about the at least one object.

44. The device of claim 41, further comprising providing the user with a list comprising at least one association based on the sharing attributes.

45. The device of claim 41, further comprising providing the user with the user interface to share the image by associating the image with other groupings of objects based on the sharing attributes using network resources.

46. A non-transitory computer readable storage medium coupled to a processor, wherein the non-transitory computer readable storage medium comprises a computer program, the computer program, when executed by the processor, causing the processor to:
access image data for an image;
access an identification of at least one object obtained by processing the image data for the image;
access sharing attributes associated with the at least one object based on the identification of the at least one object in the image, wherein the sharing attributes indicate to whom the image is to be shared rather than identifying the at least one object;
automatically associate the image with the sharing attributes accessed based on the identification of the at least one object;
generate information to share the image based on the sharing attributes; and
share the image based on the generated information.

47. An apparatus for sharing images comprising:
means for accessing image data for an image;
means for accessing an identification of at least one object obtained by processing the image data for the image;
means for accessing sharing attributes associated with the at least one object based on the identification of the at least one object in the image, wherein the sharing attributes indicate to whom the image is to be shared rather than identifying the at least one object;
means for automatically associating the image with the sharing attributes accessed based on the identification of the at least one object;
means for generating information to share the image based on the sharing attributes; and
means for sharing the image based on the generated information.

* * * * *